US007864392B2

(12) United States Patent
Ueyama

(10) Patent No.: US 7,864,392 B2
(45) Date of Patent: Jan. 4, 2011

(54) MICROSCANNER AND OPTICAL EQUIPMENT WITH THE SAME

(75) Inventor: Masayuki Ueyama, Takarazuka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 523 days.

(21) Appl. No.: 12/031,238

(22) Filed: Feb. 14, 2008

(65) Prior Publication Data

US 2008/0198433 A1 Aug. 21, 2008

(30) Foreign Application Priority Data

Feb. 16, 2007 (JP) ............................ 2007-035895

(51) Int. Cl.
*G02B 26/08* (2006.01)

(52) U.S. Cl. ................................ 359/224.1; 359/199.1

(58) Field of Classification Search ... 359/199.1–199.4, 359/200.6–200.8, 223.1–226.2; 310/309, 310/311, 330–333, 40 MM
See application file for complete search history.

(56) References Cited

U.S. PATENT DOCUMENTS

2008/0054758 A1* 3/2008 Tsuboi et al. ............... 310/309

FOREIGN PATENT DOCUMENTS

JP 2005-128147 A 5/2005

* cited by examiner

*Primary Examiner*—James Phan
(74) *Attorney, Agent, or Firm*—Sidley Austin LLP

(57) ABSTRACT

An optical scanner including a mirror part for reflecting light, a main axis part for supporting the mirror part in a pivotable manner, and a deformable holding part for holding the main axis part. A torsion bar for converting a deformation of the holding part itself into a deformation in torsion is disposed adjacent to the main axis part and is formed in at least one of the holding part and the mirror part. The deformation in torsion generated in the torsion bar makes the mirror part tilt.

15 Claims, 18 Drawing Sheets

LS
BS
A'
Y axis
Y
X
Z
PEa
HD1
H1
HD2
PEc
HD1a
HD2c
H1a
MR
X axis
Z axis
P
R
MA1
MA2
TB1
H2a
HD1b
HD2d
H3
PEb
H2
PEd
H4
A TB1
HD1a
CB
TB1
MA1
W1
D'
D
X axis
T
TB1
CB
TB1

MICROSCANNER AND OPTICAL EQUIPMENT WITH THE SAME

This application is based on Japanese Patent Application No. 2007-035895 filed on Feb. 16, 2007, the entire contents of which are hereby incorporated by reference.

BACKGROUND OF THE INVENTION

1. Field of the Invention

The present invention relates to a microscanner and optical equipment having the same.

2. Description of Related Art

Conventionally, various types of small optical scanners (microscanners) are developed, which utilize MEMS (Micro Electro Mechanical Systems) technology. For example, a first patent document (JP-A-2005-128147, paragraph 0024 and the like) discloses an optical scanner LS' as shown in FIG. 16, which includes a mirror part MR' for scanning, a torsion bar TB' for supporting the mirror part MR', and a diaphragm 101 that is connected to the mirror part MR'.

The optical scanner LS' has a structure for tilting the mirror part MR' as much as possible, in which a drive frequency of piezoelectric actuators 102 on the diaphragm 101 is the same as a mechanical resonance frequency of the mirror part MR' including the torsion bar TB'. According to this structure, the mirror part MR' can be vibrated and tilted relatively largely even if the piezoelectric actuator 102 is driven by a low voltage.

However, a tip part 103 of the diaphragm 101 connected to the mirror part MR' is hardly deformed in torsion. Therefore, a force generated in the diaphragm 101 hardly exerts on the mirror part MR' as a rotation torque. Thus, it is difficult to say that the mirror part MR' is sufficiently tilted.

Here, there may be another structure of the optical scanner LS' in which the tip part 103 is not connected with the mirror part MR'. For example, there is a structure of the optical scanner LS' as shown in FIG. 17. This optical scanner LS' includes the mirror part MR', a holding parts HD' that can be deformed by the piezoelectric elements PE', and a main axis parts MA' connecting the mirror part MR' with the holding parts HD'.

This optical scanner LS' rotates the mirror part MR' in the normal or the reverse directions with respect to an X' direction (in a P' direction or an R' direction) corresponding to deformation in flexion of the holding parts HD'. The holding parts HD' that is deformed in flexion on the tilting operation of the mirror part MR' as described above is shown in FIGS. 18A and 18B. FIG. 18A shows a cross section cut along the line a-a' in FIG. 17 in case of the normal rotation while FIG. 18B shows another cross section in case of the reverse rotation.

For convenience of description, an axial direction of the main axis parts MA' is referred to as the X' direction (or an X' axis), an extending direction of the holding parts HD' that is perpendicular to the X' direction is referred to as a Y' direction, and a direction that is perpendicular to the X' direction and to the Y' direction is referred to as a Z' direction. In addition, the upper side of FIG. 17 is referred to as a plus side in the Y' direction (Y'(+)) while the lower side opposite to the plus side is referred to as a minus side in the Y' direction (Y'(−)). Furthermore, a front side of the paper of FIG. 17 is referred to as a plus side in the Z' direction (Z'(+)) while a back side opposite to the plus side is referred to as a minus side in the Z' direction (Z'(−)).

Furthermore, only one of the two holding parts HD' (a first holding part HD1' and a second holding part HD2') is described below. When the first holding part HD1' is going to rotate the mirror part MR' in the normal or the reverse direction, the second holding part HD2' is also going to rotate the mirror part MR' in the normal or the reverse direction in the same manner.

When the mirror part MR' rotates normally as shown in FIG. 18A, a piezoelectric body PB' of the piezoelectric element PE' on the Y'(+) side expands so that the main axis parts MA' side of the holding parts HD' on the Y'(+) side droops toward the Z(−) side. At the same time, a piezoelectric body PB' of the piezoelectric element PE' on the Y'(−) side contracts so that the main axis parts MA' side of the holding parts HD' on the Y'(−) side rises toward the Z(+) side. Then, the holding parts HD' is deformed like a wave, and the main axis parts MA' is tilted in the normal direction responding to the deformation.

On the contrary, when the mirror part MR' rotates reversely as shown in FIG. 18B, the piezoelectric body PB of the piezoelectric element PE' on the Y'(+) side contracts so that the main axis parts MA' side of the holding parts HD' on the Y'(+) side rises toward the Z(+) side. At the same time, the piezoelectric body PB of the piezoelectric element PE' on the Y'(−) side expands so that the main axis parts MA' side of the holding parts HD' on the Y'(−) side droops toward the Z(−) side. Then, the holding parts HD' is deformed like a wave opposite to FIG. 18A, and the main axis parts MA' is tilted in the reverse direction responding to the deformation.

However, the plate-like holding parts HD' having a uniform thickness possesses relatively high stiffness and is hardly deformed in flexion. In addition, since the deformed part of the holding parts HD' (a bent part 107) is generated at a position relatively far from the X' axis, it is difficult to tilt a part of the holding parts HD' connected to the main axis parts MA'. Therefore, this optical scanner LS' is difficult to increase a tilt angle θ'.

Furthermore, there is a method of making the holding parts HD' be deformed in flexion easily by forming a part (the bent part 107) thinner than other parts of the holding parts HD'. In this case, an etching process may be used for example, but it is very difficult to control the thickness of the holding parts HD' accurately by the etching process because it is affected by various process conditions.

It is also possible to make the substrate of the holding parts HD' as a SOI (Silicon on Insulator) substrate for accurate etching. However, it will increase cost of the optical scanner LS' since the SOI substrate is expensive.

SUMMARY OF THE INVENTION

It is an object of the present invention to provide a microscanner that can increase its tilt angle easily.

A microscanner according to an embodiment of the present invention includes a variable member, a main axis part for supporting the variable member in a pivotable manner, a deformable holding part for holding the main axis part, and a torsion bar disposed adjacent to the main axis part and located on at least one of the holding part and the variable member. The torsion bar is deformed in torsion by deformation in flexion of the holding part, and the variable member is tilted by the deformation in torsion of the torsion bar.

The above-mentioned and other objects as well as features of the present invention will be more apparent from the following description of the preferred embodiments with reference to the attached drawings.

DETAILED DESCRIPTION OF THE PREFERRED EMBODIMENTS

First Embodiment

Figure 1:
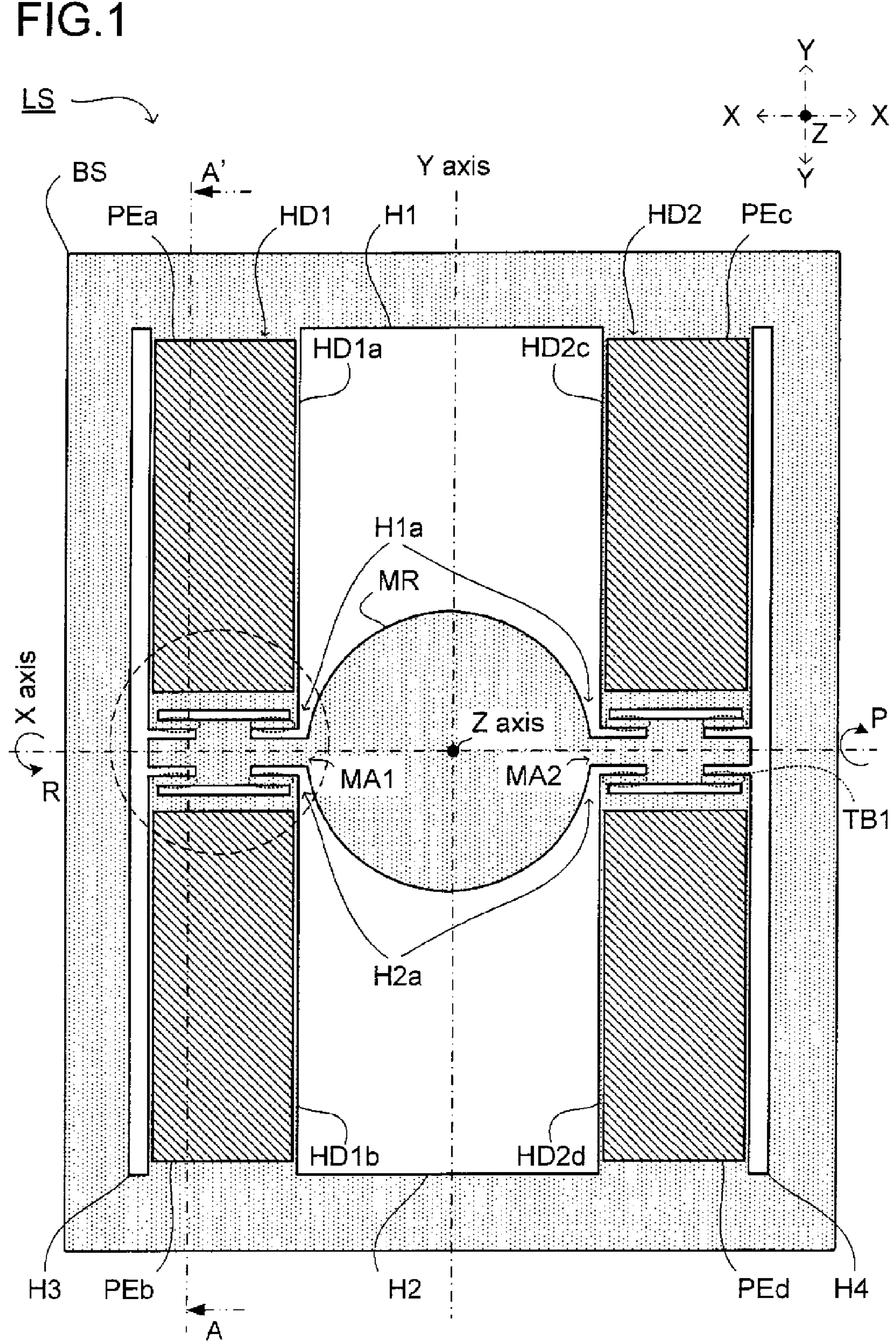
FIG. 1 is a plan view of a one-dimensional optical scanner.

A first embodiment of the present invention will be described as follows with reference to the attached drawings. Here, a mirror part is exemplified as the variable member, and an optical scanner is exemplified as the microscanner for changing the mirror part that reflects light for a scanning operation. For easy understanding, even the plan views are shown with hatching. Furthermore, reference numerals or the hatching may be omitted in some cases for convenience sake. In such cases, other drawings should be referred to. In addition, dots on the drawings indicate the direction perpendicular to the paper.

Figure 2:
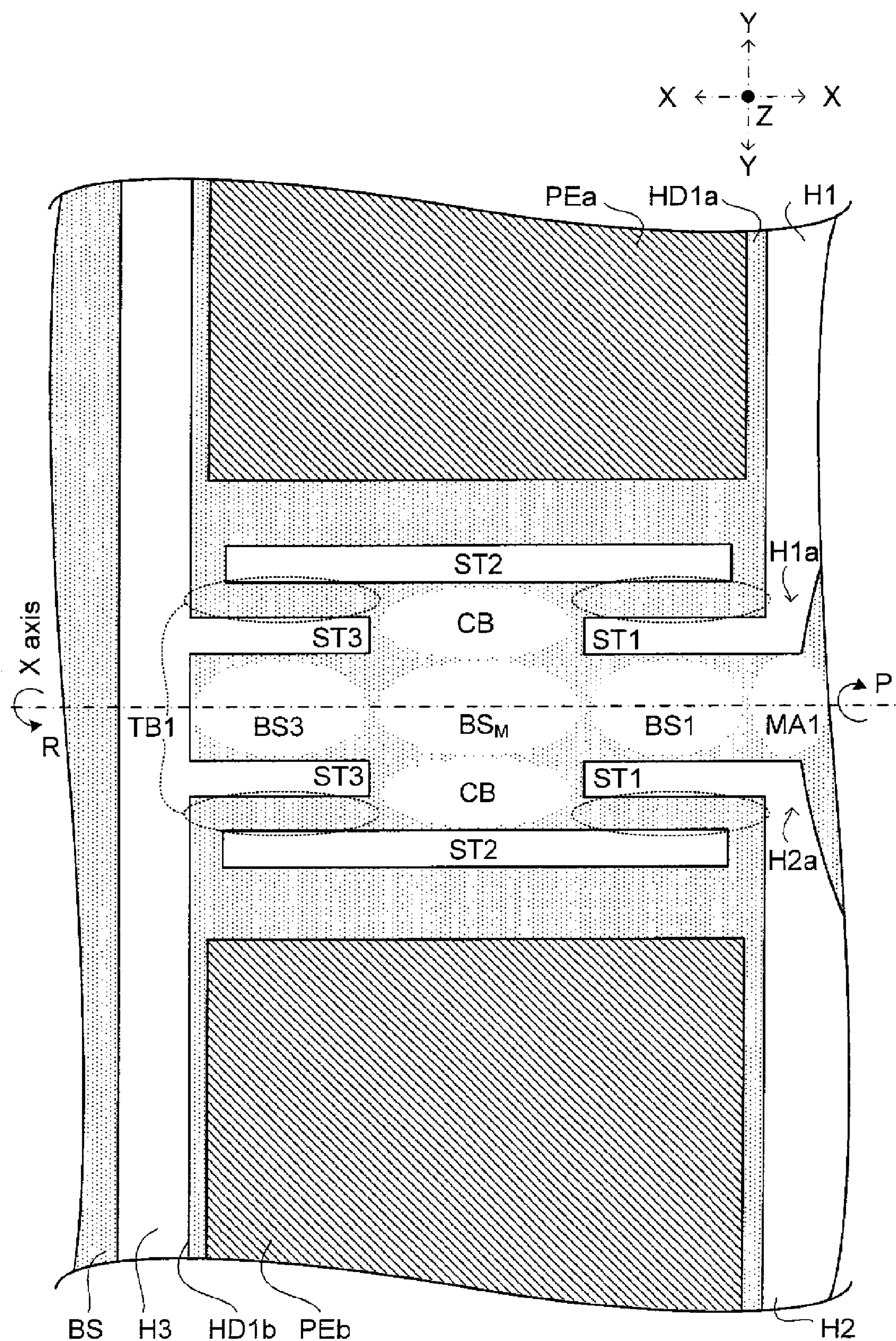
FIG. 2 is a partial magnified view of the optical scanner shown in FIG. 1.

FIG. 1 is a plan view of an optical scanner LS, and FIG. 2 is a magnified view of a part encircled by the broken line in FIG. 1. As shown in FIG. 1, the optical scanner LS includes a mirror part MR, main axis parts MA, holding parts HD, piezoelectric elements PE, and torsion bars TB (that may be referred to as a first torsion bar TB1 for convenience sake). These members are formed by etching a deformable silicon substrate or the like to be a substrate BS.

The mirror part MR is a member for reflecting light from a light source or the like. This mirror part MR is formed by sticking a reflection film made of gold, aluminum or the like on a island-like part that is generated after forming openings H (a first opening H1 and a second opening H2) side by side on the substrate BS having a rectangular shape viewed from the top as shown in FIG. 1 (i.e., a remaining part between the first opening H1 and the second opening H2).

Furthermore, the direction in which the first opening H1 and the second opening H2 are arranged is referred to as the Y direction. The first opening H1 side in the Y direction is referred to as a plus side in the Y direction (Y(+)), and the opposite side to the plus side is referred to as a minus side in the Y direction (Y(−)). In addition, the axis extending from the center of the mirror part MR in the Y direction is referred to as a Y axis.

The main axis parts MA (a first main axis part MA1 and a second main axis part MA2) are members extending outward respectively from an end and the other end that are opposed to each other at the outer edge of the mirror part MR so as to sandwich and support the mirror part MR. The main axis parts MA are formed by making parts of the substrate BS like bars at parts H1*a* and H2*a* advancing from ends of the first opening H1 and the second opening H2 adjacent to the mirror part MR.

Furthermore, the bar parts of the substrate BS (i.e., the main axis parts MA1 and MA2) extend in a direction crossing the Y direction (e.g., a direction perpendicular to the same). Therefore, this direction is referred to as the X direction. The second main axis part MA2 side in the X direction is referred to as a plus side in the X direction (X(+)), and the opposite side to the plus side is referred to as a minus side in the X direction (X(−)). In addition, the axis extending in the X direction overlapping the main axis parts MA is referred to as an X axis (a main axis direction or an X axis direction).

The holding parts HD (a first holding part HD1 and a second holding part HD2) are members for holding the main axis parts MA (with connected to the main axis parts MA) so as to the mirror part MR, too. The holding parts HD are formed as remaining parts of the substrate BS between the opening H (a third opening H3 or a fourth opening H4) extending in the Y direction and the first opening H1 plus the second opening H2.

More specifically, the remaining part of the substrate BS between the third opening H3 and the first opening H1 plus the second opening H2 is the first holding part HD1 while the remaining part of the substrate BS between the fourth opening H4 and the first opening H1 plus the second opening H2 is the second holding part HD2. The holding parts HD made of the remaining parts have a linear shape extending in the Y direction, so they are easily deformed in flexion (i.e., the Y direction is the extending direction of the holding parts HD).

The piezoelectric elements PE (PEa-PEd) are elements for converting voltage into force, and each of them includes a polarized piezoelectric body PB (PBa-PBd) and electrodes EE1 (EE1*a*-EE1*d*) and EE2 (EE2*a*-EE2*d*) that sandwich and hold the piezoelectric body PB (see FIG. 3 that will be shown later). This piezoelectric element PE is glued on the surface of the holding parts HD so that a unimorph part (an actuator) YM is formed. More specifically, one electrode (a first electrode) EE1 of the piezoelectric element PE and one surface of the holding parts HD are glued to each other so that the unimorph part YM (YMa-YMd) is formed.

In particular, the piezoelectric elements PEa and PEb are glued to the holding parts HD so as to sandwich and hold the main axis parts MA (the first main axis part MA1). Similarly, the piezoelectric elements PEc and PEd are glued to the holding parts HD so as to sandwich and hold the main axis parts MA (the second main axis part MA2). Therefore, in response to expansion or contraction of the piezoelectric bodies PB (PBa-PBd) of the piezoelectric elements PEa and PEb as well as the piezoelectric elements PEc and PEd, the holding parts HD are also deformed (deformation in flexion or deformation in bending). The optical scanner LS utilizes this deformation of the holding parts HD so that the mirror part MR can be tilted in the normal or the reverse rotation direction with respect to the main axis parts MA. The detail of this action will be described later.

The torsion bars TB1 are members for converting the deformation of the holding parts HD (the deformation in flexion or the like) into a deformation in torsion (rotation torque), which is transmitted to the main axis parts MA (see portions encircled by the dotted line in FIG. 2). The torsion bars TB1 are formed on the holding parts HD.

For example, as shown in FIG. 2, a part of the substrate BS located between the first slit ST1 extending from the advancing part H1*a* or H2*a* of the first opening H1 or the second opening H2 in the X direction and the second slit ST2 extending in the same direction (the X direction) as the first slit ST1 arranged in parallel with the same in the Y direction (i.e., a part of the portion except the slit ST in the holding parts HD) becomes the torsion bar TB1.

In addition, a part of the substrate BS located between the second slit ST2 and the third slit ST3 connected to the third opening H3, i.e., the third slit ST3 extending in the X direction next to the first slit ST1 along the X direction, becomes the torsion bar TB1.

Further, the existence of the torsion bar TB1 formed by the slit ST in the holding parts HD means existence of a gap in the holding parts HD. The existence of the gap may cause decrease of stiffness of the holding parts HD. Therefore, the holding parts HD can be deformed in bending easily.

In addition, the torsion bars extend in the direction crossing the extending direction of the holding parts HD (the Y direction), e.g., the X direction. According to this structure, the torsion bar TB1 can be twisted easily when the holding parts HD is bent.

Furthermore, a part BS1 of the substrate BS located between the first slits ST1 and ST1 is connected to the main axis part MA, and a part BS3 of the substrate BS located between the third slits ST3 and ST3 is located next to the main axis parts MA in the main axis direction. Therefore, it is possible to consider that the main axis parts MA includes the parts BS1 and BS3 as well as a part BSM of the substrate BS located between the parts BS1 and BS3. In addition, a part of the substrate BS located between the part BSM and the second slit ST2 connects the torsion bar TB1 and the main axis part MA. Therefore, this part is referred to as a connecting part CB.

Figure 3A:
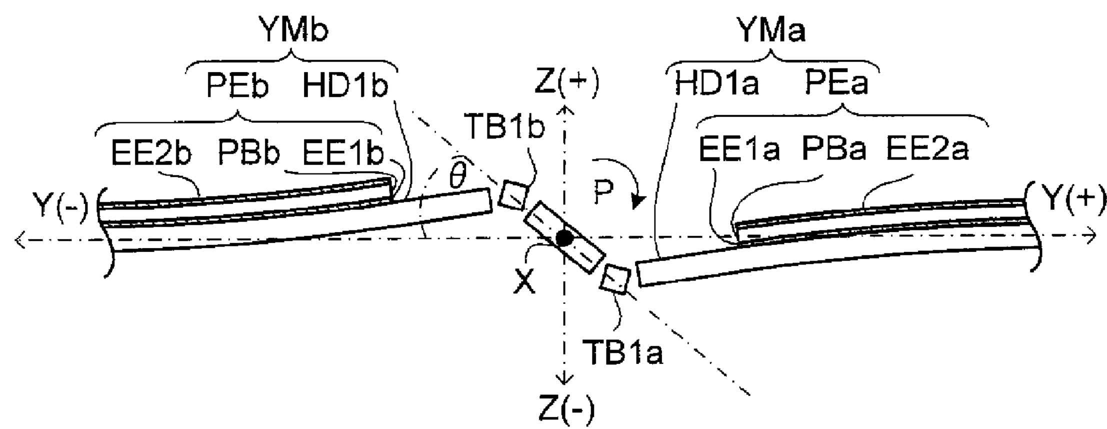
FIG. 3A is a cross-sectional view cut along the line A-A' in FIG. 1 and shows a state of the normal rotation with respect to a main axis direction.
Figure 3B:
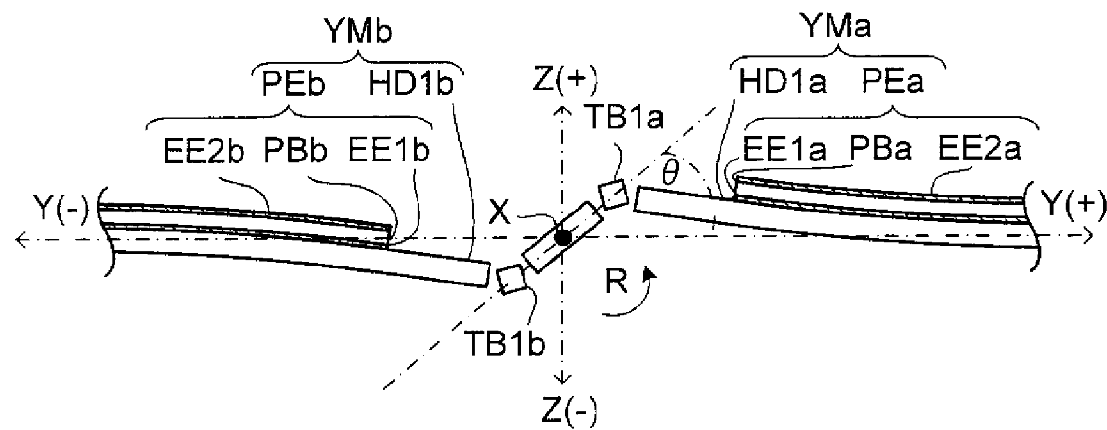
FIG. 3B is a cross-sectional view cut along the line A-A' in FIG. 1 and shows a state of the reverse rotation with respect to the main axis direction.

Here, a tilting action of the mirror part MR in the optical scanner LS will be described with reference to FIGS. 3A and 3B. FIGS. 3A and 3B are cross sectional views cut along the line A-A' in FIG. 1.

The optical scanner LS shown in FIG. 1 rotates the mirror part MR with respect to the main axis part MA (the main axis direction). Therefore, a direction around the main axis direction (a rotation in the clockwise direction from X(+) to X(−)) is referred to as a normal rotation, and a rotation in the opposite direction to the normal rotation (a rotation in the counterclockwise direction) is referred to as a reverse rotation. FIG. 3A shows the main axis part MA rotating normally, and FIG. 3B shows the main axis part MA rotating reversely (the normal rotation direction is denoted by P while the reverse rotation direction is denoted by R).

In addition, the direction perpendicular to the X direction and the Y direction is referred to as a Z direction (bending direction). The side of the mirror part MR for receiving light is referred to as a plus side in the Z direction (Z(+)), and the side opposite to the plus side is referred to as a minus side in the Z direction (Z(−)). Further, the direction extending from a point of intersection of the X axis and the Y axis in the Z direction is referred to as a Z axis.

In the following description, only one of the two holding parts HD (the first holding part HD1 and the second holding part HD2) will be described. When the first holding part HD1 is making the mirror part MR rotate normally or reversely, the second holding part HD2 also makes the mirror part MR to rotate normally or reversely.

As shown in FIG. 3A and 3B, the piezoelectric element PE (PEa and PEb) includes the first electrodes EE1*a* and EE1*b* and the second electrodes EE2*a* and EE2*b* that are opposed to the first electrodes EE1*a* and EE1*b* via the piezoelectric bodies PBa and PBb. When a voltage having positive and negative polarity (an AC voltage) is applied between the first electrode EE1*a* and the second electrode EE2*a* (and between the first electrode EE1*b* and the second electrode EE2*b*) within a range that does not cause polarization reversal, the piezoelectric bodies PBa and PBb expanded or contracted so that the unimorph parts YMa and YMb are deformed in flexion.

More specifically, in order to rotate the mirror part MR normally as shown in FIG. 3A, a voltage for expanding the piezoelectric body PBa is applied to the same while a voltage for contracting the piezoelectric body PBb (i.e., a voltage having a phase opposite to the voltage applied to the piezoelectric body PBa) is applied to the same.

When such voltages are applied, the piezoelectric body PBa is expanded so that a part of the first holding part HD1 (a holding fragment HD1*a*) glued to the first electrode EE1*a* is deformed in flexion in a convex manner toward the Z(+) side. As a result, the main axis part MA side of the holding fragment HD1*a* droops toward the Z(−) side. On the other hand, the piezoelectric body PBb is contracted so that a part of the first holding part HD1 (a holding fragment HD1*b*) glued to the first electrode EE1*b* is deformed in flexion in a convex manner toward the Z(−) side. As a result, the main axis part MA side of the holding fragment HD1*b* rises toward the Z(+) side.

When the holding fragments HD1*a* and HD1*b* are deformed in flexion as described above, the Y(+) side of the main axis part MA is pressed down via the torsion bar TB1 (TB1*a*) while the Y(−) side of the main axis part MA is pressed up via the torsion bar TB1 (TB1*b*), so that the main axis parts MA is rotated normally. In this case, the torsion bars TB1*a* and TB1*b* are twisted easily with respect to an axial direction (a bar axis direction). Therefore, compared with an optical scanner without a torsion bar, the optical scanner LS having the torsion bar TB1 can rotate the mirror part MR largely.

On the contrary, in order to rotate the mirror part MR reversely as shown in FIG. 3B, a voltage for contracting the piezoelectric body PBa is applied to the same while a voltage for expanding the piezoelectric body PBb is applied to the same.

When such voltages are applied, the piezoelectric body PBa is contracted so that the holding fragment HD1*a* glued to the first electrode EE 1*a* is deformed in flexion in a convex manner toward the Z(−) side. As a result, the main axis part MA side of the holding fragment HD1*a* rises toward the Z(+) side. On the other hand, the piezoelectric body PBb is expanded so that the holding fragment HD1*b* glued to the first electrode EE1*b* is deformed in flexion in a convex manner toward the Z(+) side. As a result, the main axis part MA side of the holding fragment HD1*b* droops toward the Z(−) side.

When the holding fragments HD1*a* and HD1*b* are deformed in flexion as described above, the Y(+) side of the main axis part MA is pressed up via the torsion bar TB1 (TB1*a*) while the Y(−) side of the main axis parts MA is pressed down via the torsion bar TB1 (TB1*a*) (since the Y(+) side and the Y(−) side of the main axis parts MA move in a manner opposite to case of the normal rotation), so that the main axis parts MA is rotated reversely.

As described above, the rotation of the mirror part MR (the normal rotation and the reverse rotation) utilizes the deformation in torsion of the torsion bar TB1 that easily rotates the main axis parts MA and the deformation in flexion of the holding fragments HD1*a* and HD1*b* (i.e., the holding parts HD ). Therefore, a rotation quantity of the main axis parts MA (i.e., a rotation angle θ in the normal rotation or a rotation angle θ in the reverse rotation) becomes larger than a rotation quantity in the case where only the deformation in flexion of the holding parts HD contributes the rotation of the main axis parts MA. (In other words, a sufficient rotation quantity of the main axis parts MA can be secured efficiently).

In addition, the torsion bars TB1 (TB1*a* and TB1*b*) formed by the slits ST (ST1, ST2 and ST3) can be located relatively close to the main axis parts MA. According to this structure, the torsion bar TB1 that is relatively close to the main axis parts MA can contribute to a larger rotation angle than the torsion bar TB1 that is relatively far from the main axis parts MA even if the quantity of the deformation in flexion of the holding parts HD is constant.

Therefore, since there is the torsion bar TB1 and it is located relatively close to the main axis parts MA, the mirror part MR can be rotated relatively largely with respect to the main axis parts MA so that the rotation angle θ (or the tilt angle θ) can be large. In other words, even if the deformation in flexion of the unimorph part YM is relatively small, the mirror part MR can be tilted relatively largely because there is the torsion bar TB1 and it is located relatively close to the main axis parts MA.

Note that the rotation angle θ means an angle between the mirror part MR that is stationary without affected by the unimorph part YM and the mirror part MR that moves.

Second Embodiment

A second embodiment of the present invention will be described below. Note that members having the same functions as the members used in the first embodiment are denoted by the same reference numerals, so that descriptions thereof will be omitted.

In the description of first embodiment, the optical scanner LS having the mirror part MR (a one-dimensional mirror) that rotates with respect to the main axis direction (the X axis) is exemplified. However, the present invention is not limited to this embodiment, but it can be applied to an optical scanner LS having a mirror part MR (a two-dimensional mirror) that rotates with respect to the X axis and the Y axis. Therefore, the second embodiment will be described as the optical scanner LS having the two-dimensional mirror part MR with reference to FIG. 4.

Figure 4:
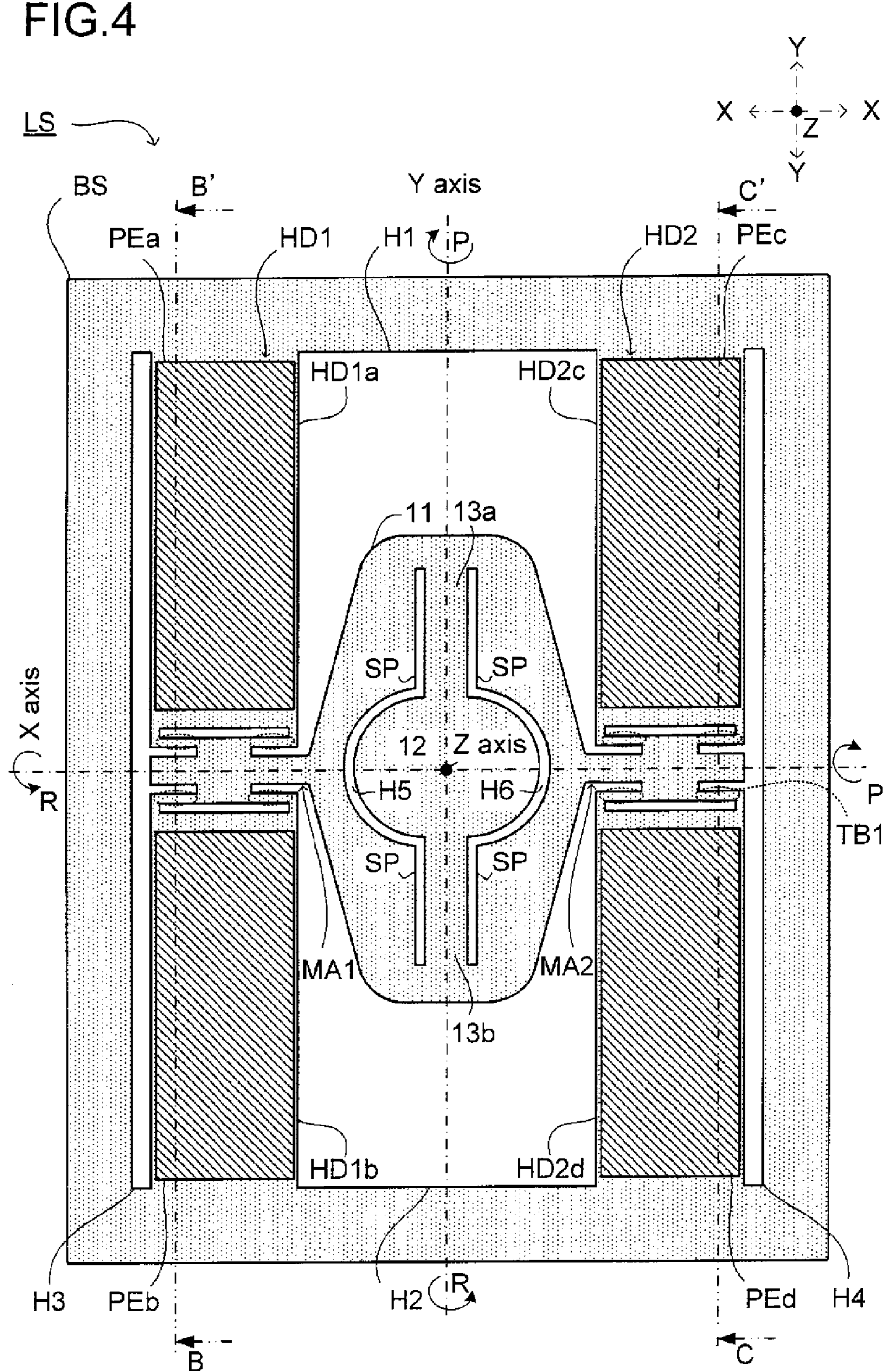
FIG. 4 is a plan view of a two-dimensional optical scanner.

FIG. 4 shows a plan view of the optical scanner LS. As shown in FIG. 4, the optical scanner LS with the two-dimensional mirror and the optical scanner LS with the one-dimensional mirror shown in FIG. 1 have different mirror parts MR and the same holding parts HD and the like. Therefore, the mirror part MR will be described mainly. Note that members included in the mirror part MR are formed by etching the deformable silicon substrate or the like to be the substrate BS in the same manner as the first embodiment.

The mirror part MR includes a movable frame 11, a mirror fragment 12, and a mirror fragment torsion bar (a sub axis part) 13.

The movable frame 11 is a member surrounding the mirror fragment 12. More specifically, the movable frame 11 lets the mirror fragment 12 be located in the frame and is connected to mirror fragment torsion bars 13 (13*a* and 13*b*) that extend from the mirror fragment 12 so as to sandwich the mirror fragment 12. In addition, the movable frame 11 is supported by the main axis parts MA (MA1 and MA2). Therefore, the movable frame 11 can rotate normally and reversely with respect to the main axis parts MA by utilizing the deformation of the holding parts HD in the same manner as in the first embodiment.

The mirror fragment 12 is formed by gluing a reflection film made of a metal such as aluminum to a part between island-like parts formed by the openings H (a fifth opening H5 and a sixth opening H6) located in parallel to each other in the movable frame 11 (i.e., a remaining part between the fifth opening H5 and the sixth opening H6). Therefore, the mirror fragment 12 is a fragment member for reflecting light.

The mirror fragment torsion bars 13 (13*a* and 13*b*) are members extending outward respectively from an end and the other end that are opposed to each other at the outer edge of the mirror fragment 12 so as to sandwich and support the mirror fragment 12 in a pivotable manner. The mirror fragment torsion bars 13 are formed by making parts of the substrate BS extending in the Y direction like bars at parts advancing from ends of the fifth opening H5 and the sixth opening H6 adjacent to the mirror fragment 12 (linear slit parts SP).

Figure 5A:
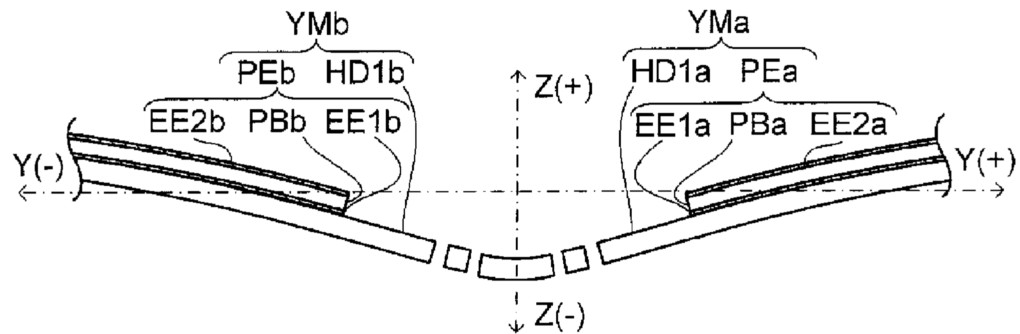
FIG. 5A is a cross-sectional view cut along the line B-B' in FIG. 4 and shows an action of the normal rotation with respect to the Y direction.
Figure 5B:
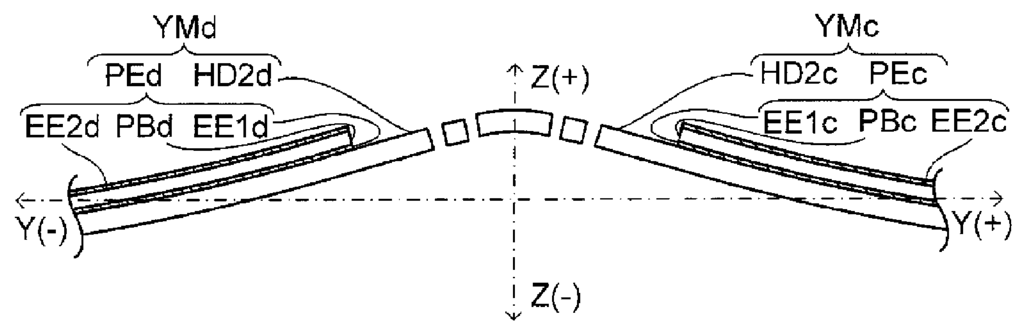
FIG. 5B is a cross-sectional view cut along the line C-C' in FIG. 4 and shows an action of the normal rotation with respect to the Y direction.
Figure 5C:
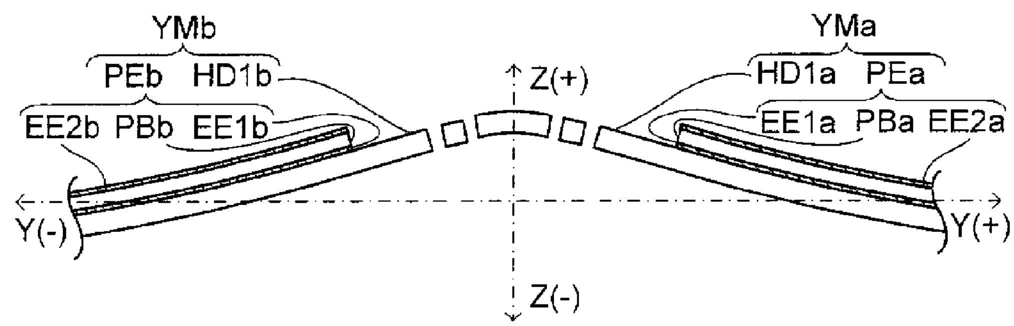
FIG. 5C is a cross-sectional view cut along the line B-B' in FIG. 4 and shows an action of the reverse rotation with respect to the Y direction.
Figure 5D:
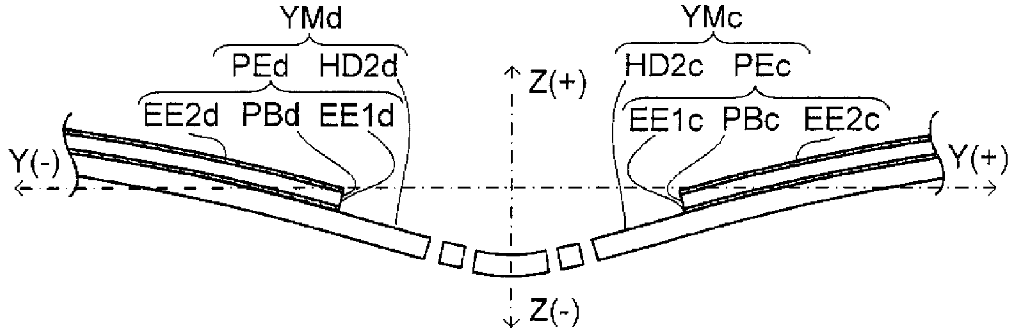
FIG. 5D is a cross-sectional view cut along the line C-C' in FIG. 4 and shows an action of the reverse rotation with respect to the Y direction.

Here, a tilting action of the mirror part MR in the optical scanner LS will be described with reference to FIGS. 3A, 3B and 5A-5D. Here, the reason for referring to FIGS. 3A and 3B again is that the members shown in the cross-sectional view cut along the line B-B' in FIG. 4 are the same as those shown in the cross-sectional view cut along the line A-A' in FIG. 1 and that the rotation state of the main axis parts MA are also the same between them. In addition, FIGS. 5A and 5C are cross-sectional views cut along the line B-B' in FIG. 4, and FIGS. 5B and 5D are cross-sectional views cut along the line C-C' in FIG. 4.

First, a rotation action of the main axis parts MA with respect to the main axis direction will be described with reference to FIGS. 3A and 3B. In the following description, only one of the first holding part HD1 and the second holding part HD2 will be described. When the first holding part HD1 is rotating the movable frame 11 normally or reversely so that the mirror fragment 12 rotates normally or reversely, the second holding part HD2 is also rotating the movable frame 11 normally or reversely.

The normal rotation of the mirror part MR with respect to the main axis direction means that the movable frame 11 rotates normally with respect to the main axis parts MA so that the normal rotation causes a normal rotation of the mirror fragment 12 with respect to the X axis. For this purpose, a voltage for expanding the piezoelectric body PBa is applied while a voltage for contracting the piezoelectric body PBb is applied as shown in FIG. 3A.

When the above-mentioned voltages are applied, the Y(+) side of the main axis part MA is pressed down via the torsion bar TB1 (TB1*a*) while the Y(−) side of the main axis parts MA is pressed up via the torsion bar TB1 (TB1*b*), so that the main axis parts MA is rotated normally in the same manner as the first embodiment. In this case, the torsion bars TB1*a* and TB1*b* are twisted easily with respect to the axial direction (the bar axis direction). Therefore, the optical scanner LS having the torsion bar TB1 can rotate the mirror part MR more largely than an optical scanner without a torsion bar.

On the contrary, the reverse rotation of the mirror part MR with respect to the main axis direction means that the movable frame 11 rotates reversely with respect to the main axis parts MA so that the reverse rotation causes a reverse rotation of the mirror fragment 12 with respect to the X axis. For this purpose, a voltage for contracting the piezoelectric body PBa is applied while a voltage for expanding the piezoelectric body PBb is applied as shown in FIG. 3B.

When the above-mentioned voltages are applied, the Y(+) side of the main axis parts MA is pressed up via the torsion bar TB1 (TB1*a*) while the Y(−) side of the main axis parts MA is pressed down via the torsion bar TB1 (TB1*b*) (since the Y(+) side and the Y(−) side of the main axis parts MA move in the directions opposite to the case of the normal rotation) in the same manner as the first embodiment. Thus, the main axis parts MA rotates reversely.

A principle of the above-mentioned rotation action of the main axis parts MA with respect to the main axis direction is the same as the case of the optical scanner LS having the one-dimensional mirror described above as the first embodiment. Therefore, even the optical scanner LS having the two-dimensional mirror can exert the effect described above in the first embodiment.

Next, the rotation action with respect to the Y axis will be described with reference to FIGS. 5A-5D. Note that FIGS. 5A and 5B show the action of the normal rotation with respect to the Y direction while FIGS. 5C and 5D show the action of the reverse rotation with respect to the Y direction. In addition, the normal rotation with respect to the Y direction is a clockwise rotation from the Y(+) side to the Y(−) side, and the reverse rotation is a rotation in the direction opposite to the normal rotation (the normal rotation direction is indicated by P while the reverse rotation direction is indicated by R in the drawings).

In order to rotate the mirror part MR normally with respect to the Y direction, a voltage for expanding the piezoelectric bodies PBa and PBb of the first holding part HD1 as shown in FIG. 5A. When the voltage is applied, the expanding piezoelectric bodies PBa and PBb deform the holding fragments HD1*a* and HD1*b* that are glued to the first electrodes EE1*a* and EE1*b* in a convex manner toward the Z(+) side. As a result, the first main axis part MA1 sides of the holding fragments HD1*a* and HD1*b* droop toward the Z(−) side, so that the first main axis part MA1 also moves toward the Z(−) side.

On the other hand, as shown in FIG. 5B, a voltage for contracting piezoelectric bodies PBc and PBd of the second holding part HD2 (second holding fragments HD2*c* and HD2*d*) is applied. When the voltage is applied, the contracting piezoelectric bodies PBc and PBd deform the holding fragments HD2*c* and HD2*d* that are glued to the first electrodes EE1*c* and EE1*d* in a convex manner toward the Z(−) side. As a result, the second main axis part MA2 sides of the holding fragments HD2*c* and HD2*d* rise toward the Z(+) side, so that the second main axis part MA2 also moves toward the Z(+) side.

In this way, when the first holding part HD1 moves the first main axis part MA1 toward the Z(−) side while the second holding part HD2 moves the second main axis part MA2 toward the Z(+) side, the movable frame 11 sandwiched between the first main axis part MA1 and the second main axis part MA2 is tilted. When the movable frame 11 is tilted in this way, the mirror fragment 12 of the movable frame 11 is also tilted. Then, this tilting is caused from the movements of the first main axis part MA1 and the second main axis part MA2 that are separated from the Y axis by substantially the same distance. Therefore, if the Y axis is considered to be a reference, the mirror fragment 12 rotates normally with respect to the Y axis.

Next, when the mirror part MR rotates reversely with respect to the Y direction, a voltage for contracting the piezoelectric bodies PBa and PBb of the first holding part HD1 is applied as shown in FIG. 5C. When this voltage is applied, the contracting piezoelectric bodies PBa and PBb deform the holding fragments HD1*a* and HD1*b* in a convex manner toward the Z(−) side. As a result, the first main axis part MA1 sides of the holding fragments HD1*a* and HD1*b* rise toward the Z(+)side, so that the first main axis part MA1 also moves toward the Z(+) side.

On the other hand, as shown in FIG. 5D, a voltage for expanding the piezoelectric bodies PBc and PBd of the second holding part HD2 is applied. When the voltage is applied, the expanding piezoelectric bodies PBc and PBd deform the holding fragments HD2*c* and HD2*d* in a convex manner toward the Z(+) side. As a result, the second main axis part M2 sides of the holding fragments HD2*c* and HD2*d* droop toward the Z(−) side, so that the second main axis part MA2 also moves toward the Z(−) side.

When the first holding part HD1 moves the first main axis part MAI toward the Z(+) side while the second holding part HD2 moves the second main axis part MA2 toward the Z(−) side in this way, the mirror fragment 12 is tilted in the same manner as in the normal rotation, so that the mirror fragment 12 rotates reversely with respect to the Y axis.

Here, the rotation angle θ (or the tilt angle θ) of the normal or the reverse rotation of the direction mirror fragment 12 with respect to the Y axis as described above is relatively small. However, when the movable frame 11 is tilted, the mirror fragment torsion bar 13 extending along the Y axis (in the Y axis direction) will rotate following the tilt action of the movable frame 11.

Therefore, in the optical scanner LS with the two-dimensional mirror, a frequency of the voltage applied to the piezoelectric elements PE (PEa-PEd) for tilting the movable frame

11 is close to a resonance frequency of a rotation oscillation of the mirror fragment 12 with respect to the mirror fragment torsion bar 13 (the Y axis direction). According to this structure, even if the tilt quantity of the movable frame 11 is relatively small, the mirror fragment 12 can be rotated relatively largely because of its resonance at the frequency of the voltage applied to the piezoelectric element PE.

Note that the voltage signal that is applied to the piezoelectric element PE actually is a combination of the signal for rotating the mirror part MR with respect to the X direction and the signal for rotating the mirror part MR with respect to the Y direction.

Third Embodiment

A third embodiment of the present invention will be described below. Note that members having the same functions as the members used in the first or the second embodiment are denoted by the same reference numerals, so that descriptions thereof will be omitted. In this third embodiment, the torsion bar TB1 formed in the holding parts HD will be described in detail.

Figure 6:
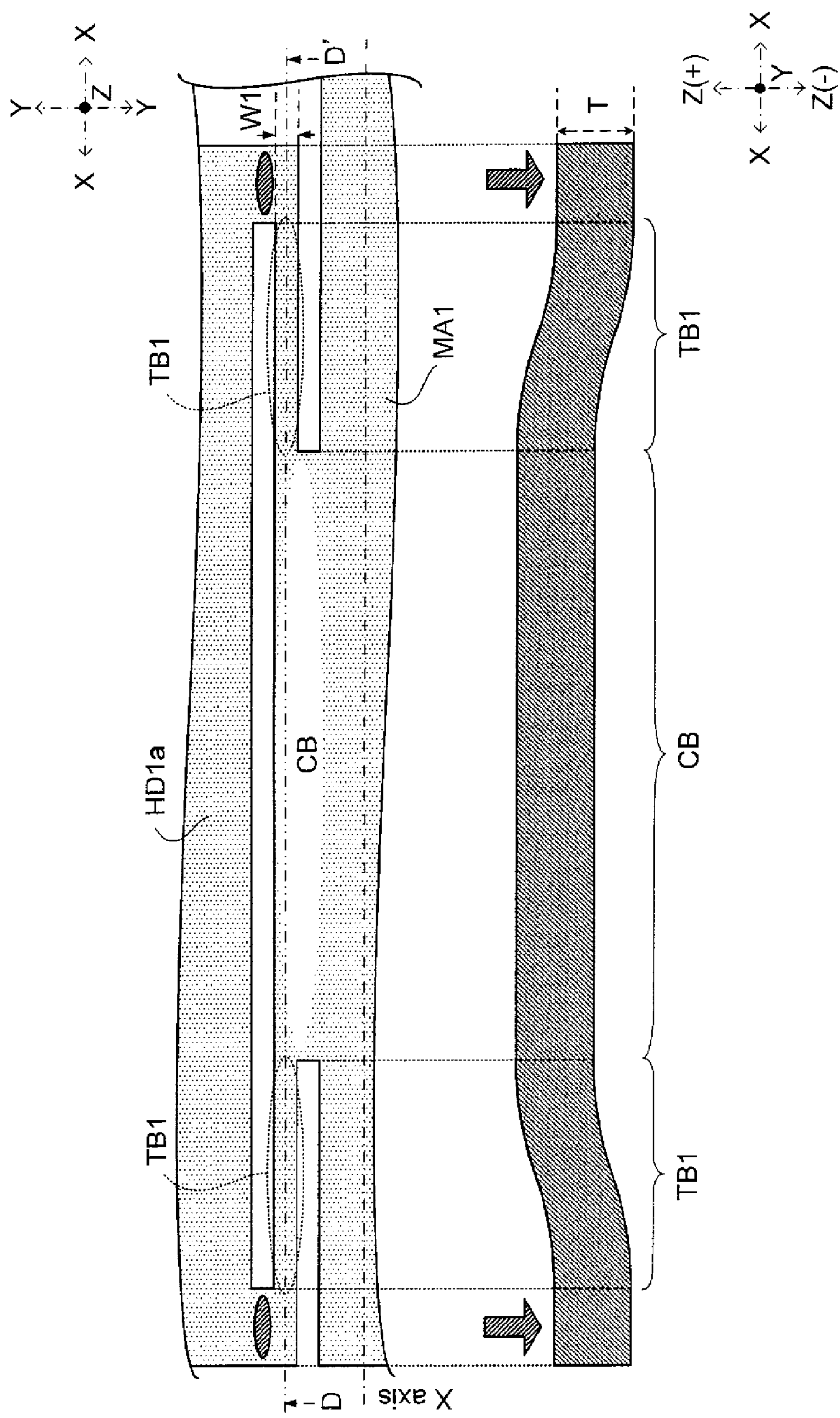
FIG. 6 shows a plan view of a first holding part having a first torsion bar and a cross-sectional view cut along the line D-D' in the plan view.

First, a displacement of the torsion bar TB1 except the twist will be described with reference to FIG. 6. Note that FIG. 6 shows a plan view of the first holding part HD1 with the torsion bar TB1 and a cross sectional view cut along the line D-D' in the plan view in the case where the mirror part MR rotates normally.

When the mirror part MR rotates normally, the main axis part MA side of the holding fragment HD1*a* droops toward the Z(−) side (see FIG. 3A). When the main axis part MA side of the holding fragment HD1*a* droops in this way, a load is put on a part of the holding fragment HD1*a* at an end of the torsion bar TB1 separated from the connecting part CB in the X direction (see an ellipse with hatching).

Since this load exerts a force directed toward the Z(−) side (see an arrow with hatching), the part on which the load is put move toward the Z(−) direction. Then, an end of the torsion bar connected to the part on which the load is put also moves toward the Z(−) side, so that the torsion bar TB1 bends as a whole as shown in the cross sectional view. More specifically, an end of the torsion bar TB1 moves toward the Z direction while the other end of the torsion bar TB1 connected to the connecting part CB does not move, so that the torsion bar TB1 is deformed to bend.

Since this bend absorbs the displacement of the unimorph part YB, it is not desirable for the mirror part MR that secures the rotation angle θ for setting with the displacement. Therefore, it is desirable that the bend of the torsion bar TB1 can be prevented as much as possible.

For this reason, as to the optical scanner LS, the length in the thickness direction of the torsion bar (thickness T) is larger than the length in the width direction of the torsion bar (width W1). According to this structure, the load that is put on an end of the torsion bar TB1 in the Z direction is put on the thickness of the torsion bar TB1 having a relatively large thickness, so that the torsion bar TB1 becomes hard to bend. Therefore, if the optical scanner LS has such a structure, reduction of the rotation angle θ of the mirror part MR due to the bend of the torsion bar TB1 can be prevented.

Note that the thickness direction of the torsion bar TB1 is the same as the thickness direction of the substrate BS. More specifically, the thickness direction of the torsion bar TB1 is perpendicular to the main axis direction (X axis direction) of the main axis parts MA and is perpendicular to the expanding direction of the first holding part HD1 (i.e., the Z direction). On the other hand, the width direction of the torsion bar TB1 is perpendicular to the main axis direction of the main axis parts MA and is the same as the expanding direction of the first holding part HD1 (i.e., the Y direction).

In addition, the thickness T of the torsion bar can be made larger than the width W1 of torsion bar easily only by etching the substrate BS made of a silicon substrate or the like. It is because that the slits ST having widths (slit widths) that are 10 μm or smaller can be made vary close to each other if the thickness of the substrate BS (i.e., the thickness of the torsion bar TB1) is several ten to several hundred micrometers (Furthermore, it is relatively easy to secure an aspect ratio of the width of the slit to the thickness of the substrate BS to be approximately 20).

In addition, the slits ST pass through the substrate BS. Therefore, it is easier to make the torsion bar TB1 as the remaining part between the slits ST than to make the torsion bar TB1 by forming grooves or the like that do not pass through the substrate by etching.

Next, the number of the torsion bars TB1 and the arrangement of the same will be described. Since the torsion bars TB1 are remaining parts of the substrate BS after forming the slits ST by etching on the holding parts HD (e.g., parts between the slits ST on the substrate BS), the number and the arrangement thereof can be selected variously and easily.

Figure 7A:
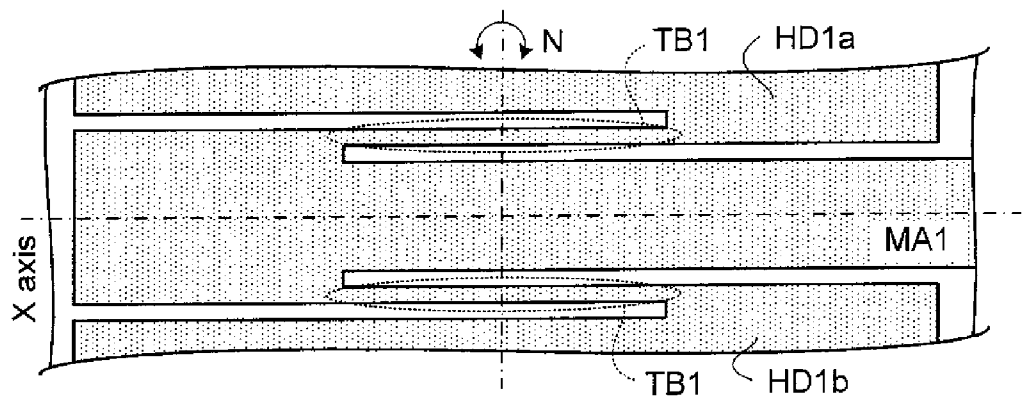
FIG. 7A is a plan view showing a holding part on which one torsion bar is located in the X direction.

For example, as shown in FIG. 7A, the torsion bars TB1 and TB1 may be positioned so as to sandwich the main axis parts MA. In other words, it is sufficient that one torsion bar TB1 is provided to each of the holding fragments HD1*a* and HD1*b* in the X direction. It is because that even if only one torsion bar TB1 is provided to each of the holding fragments HD1*a* and HD1*b*, the deformation in flexion of the holding parts HD can be converted into the deformation in torsion.

Furthermore, if the holding parts HD is deformed in flexion, an unnecessary rotation oscillation N is usually generated in the holding parts HD with respect to the direction (the Y direction or the like) crossing the main axis direction (see FIG. 7A). Then, this rotation oscillation N absorbs the deformation in torsion of the torsion bar TB1 or oscillates in resonance so as to exerts an abnormal stress to the torsion bar TB1. In other words, the rotation oscillation N may become an obstacle to the deformation in torsion of the torsion bar TB1. Therefore, it is desirable to prevent the rotation oscillation N from being generated as much as possible.

Figure 7B:
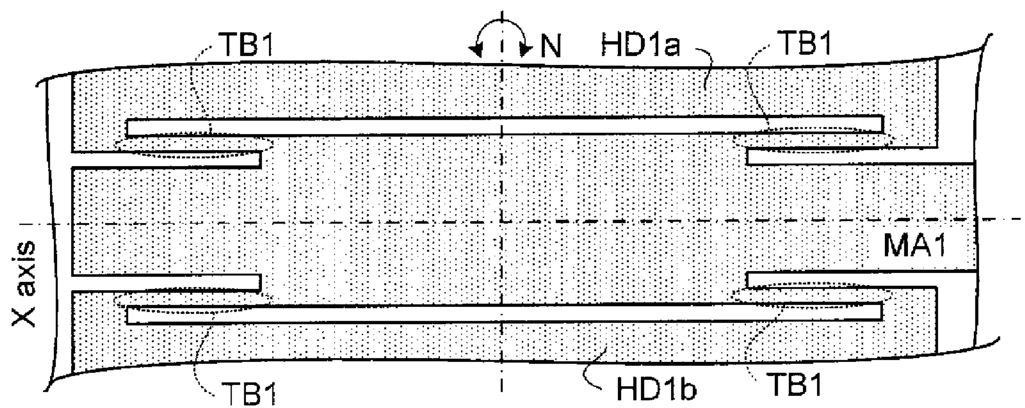
FIG. 7B is a plan view showing a holding part on which two torsion bars are located in the X direction.
Figure 7C:
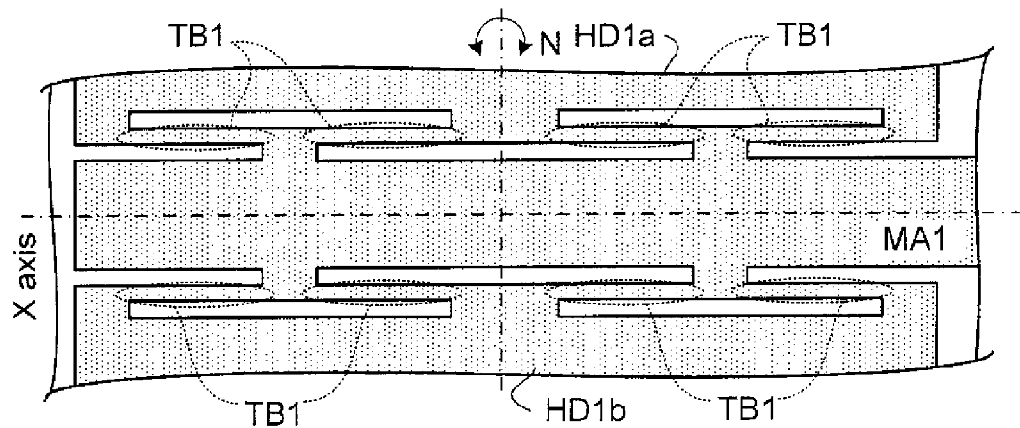
FIG. 7C is a plan view showing a holding part on which four torsion bars are located in the X direction.

Then, as shown in FIGS. 7B and 7C, it is desirable that a plurality of the torsion bars TB1 be arranged along the main axis direction of the main axis parts MA. More specifically, two torsion bars TB1 may be arranged in parallel in the X direction for each of the holding fragments HD1*a* and HD1*b* (see FIG. 7B), or four torsion bars TB1 may be arranged in parallel in the X direction for each of the holding fragments HD1*a* and HD1*b* (see FIG. 7C).

In this case where a plurality of torsion bars TB1 are arranged along the main axis direction of the main axis parts MA, the rotation oscillation N is dispersed to the individual torsion bars TB1 and is absorbed by the same. Therefore, the rotation oscillation N can be suppressed more in this case than in the case where only one torsion bar TB1 is used.

Figure 8A:
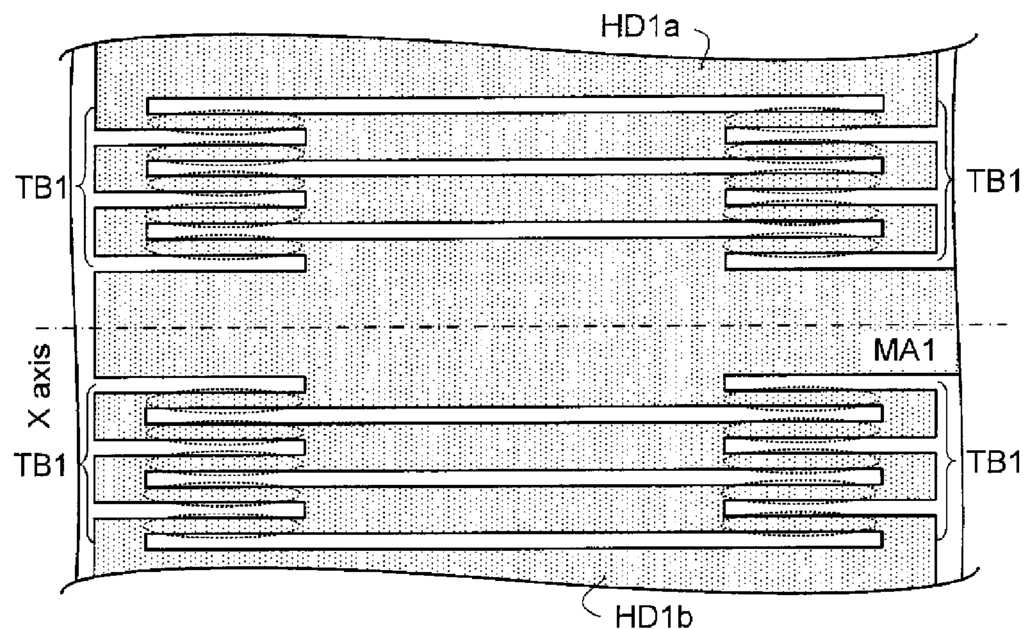
FIG. 8A is a plan view showing a holding part on which torsion bars having the same length are arranged in the X direction and in the Y direction like a matrix.
Figure 8B:
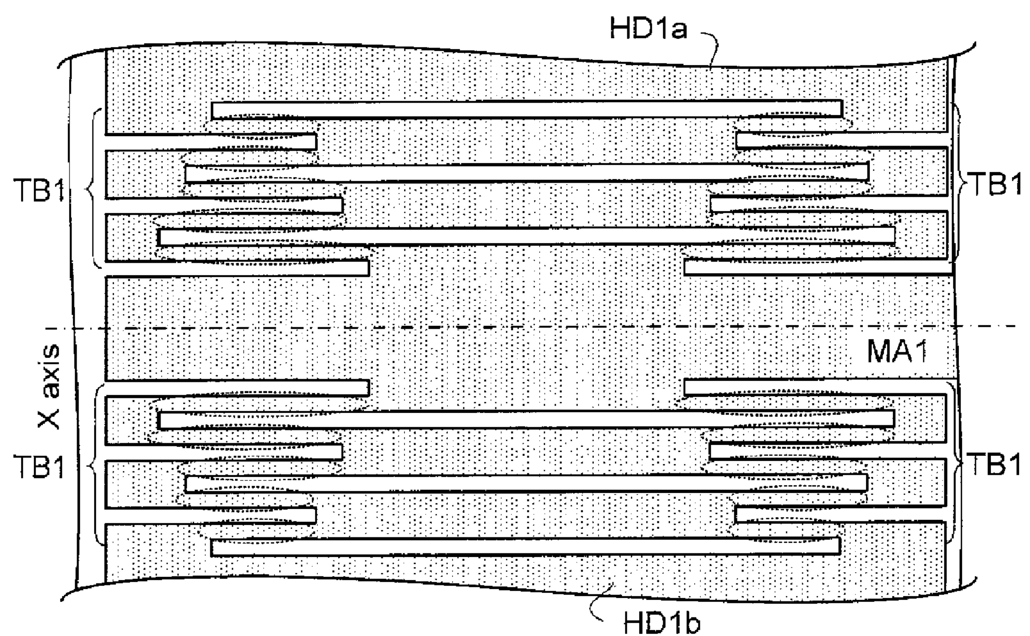
FIG. 8B is a plan view showing a holding part on which torsion bars having different lengths are arranged in the X direction and in the Y direction like a matrix.

In addition, it is possible that a plurality of torsion bars TB1 are arranged in parallel in the direction perpendicular to the main axis direction of the main axis parts MA (i.e., in the Y direction). For example, as shown in FIGS. 8A and 8B, another torsion bar TB1 may be arranged along the Y direction and separated from the main axis parts MA with respect to each of the torsion bars TB1 that are arranged along the X direction and are closest to the main axis parts MA (in other words, the torsion bars TB1 in each of the holding fragments HD1*a* and HD1*b* may be arranged in the X direction and in the Y direction like a matrix).

According to this structure, an excessive load put on the torsion bar TB1 (an excessive twist amount) can be reduced. For example, if the case where the holding parts HD shown in FIG. 8A rotates the mirror part MR by the rotation angle θ is compared with the case where the holding parts HD shown in FIG. 7B rotates the mirror part MR by the same rotation angle θ, the twist amount of the torsion bar TB1 in the former case is smaller than the twist amount of the torsion bar TB1 in the latter case.

This is because that the load necessary for rotating the mirror part MR by a certain rotation angle θ is dispersed to a plurality of torsion bars TB1. In other words, it is because that the deformation in flexion (the load) of the holding parts HD along the Y direction is dispersed and transmitted to the plurality of torsion bars TB1 that are arranged along the Y direction. Then, if the torsion bar TB1 is twisted by the dispersed load as described above only in a relatively small quantity, durability of the torsion bar TB1 will be improved.

In addition, the dispersion of the load to the plurality of torsion bars TB1 means that even a relatively small load can be transmitted to the torsion bar TB1 easily. Therefore, the optical scanner LS having a plurality of torsion bars TB1 arranged in parallel in the Y direction can rotate the mirror part MR even if the bending force of the holding parts HD is small.

If the plurality of torsion bars TB1 are arranged in parallel along the Y direction as described above, a moment exerted on the torsion bar TB1 is different between the case where it is close to the main axis parts MA and the case it is far from the main axis parts MA. More specifically, the farther from the main axis parts MA, the larger the moment exerted on the torsion bar TB1 becomes. Then, the larger the moment is, the larger the twist amount of the torsion bar TB1 is.

Therefore, the individual torsion bars TB1 arranged along the Y direction have different lengths (different entire lengths). More specifically, the entire lengths of the torsion bars TB1 become shorter as being farther from the main axis parts MA.

According to this structure, the torsion bar TB1 that is farther from the main axis parts MA has larger rigidity (torsional rigidity). Therefore, the torsion bar TB1 having relatively large rigidity is not broken by the moment that is increased when being separated from the main axis parts MA. In addition, a large moment is exerted on the torsion bar TB1 having relatively large rigidity while only a small moment is exerted on the torsion bar TB1 having relatively small rigidity (i.e., a level of the rigidity is proportional to a magnitude of the moment). Therefore, the twist quantities (twist angles) of the individual torsion bars TB1 can be harmonized (The distribution of the twist angles can be adjusted).

Note that the method of making a level of the rigidity be substantially proportional to a magnitude of the moment is not limited to changing the lengths of the individual torsion bars TB1. For example, lengths in the width direction of the individual torsion bars TB1 (i.e., the widths W1, see FIG. 6) may be different from each other. More specifically, even if the entire lengths of the individual torsion bars TB1 are the same, the lengths in the width direction of the individual torsion bars TB1 may become larger as being farther from the main axis parts MA.

According to this structure, a level of the rigidity is substantially proportional to a magnitude of the moment. Therefore, this optical scanner LS can also prevent breakage of the torsion bar TB1 while twist quantities of the individual torsion bars TB1 can be harmonized.

Note that it is possible to adopt another structure in which both the length in the width direction of the torsion bar TB1 and the entire length of the torsion bar are altered appropriately so that a level of the rigidity is substantially proportional to a magnitude of the moment.

Fourth Embodiment

A fourth embodiment of the present invention will be described below. Note that members having the same functions as the members used in the first to the third embodiment are denoted by the same reference numerals, so that descriptions thereof will be omitted.

Figure 9:
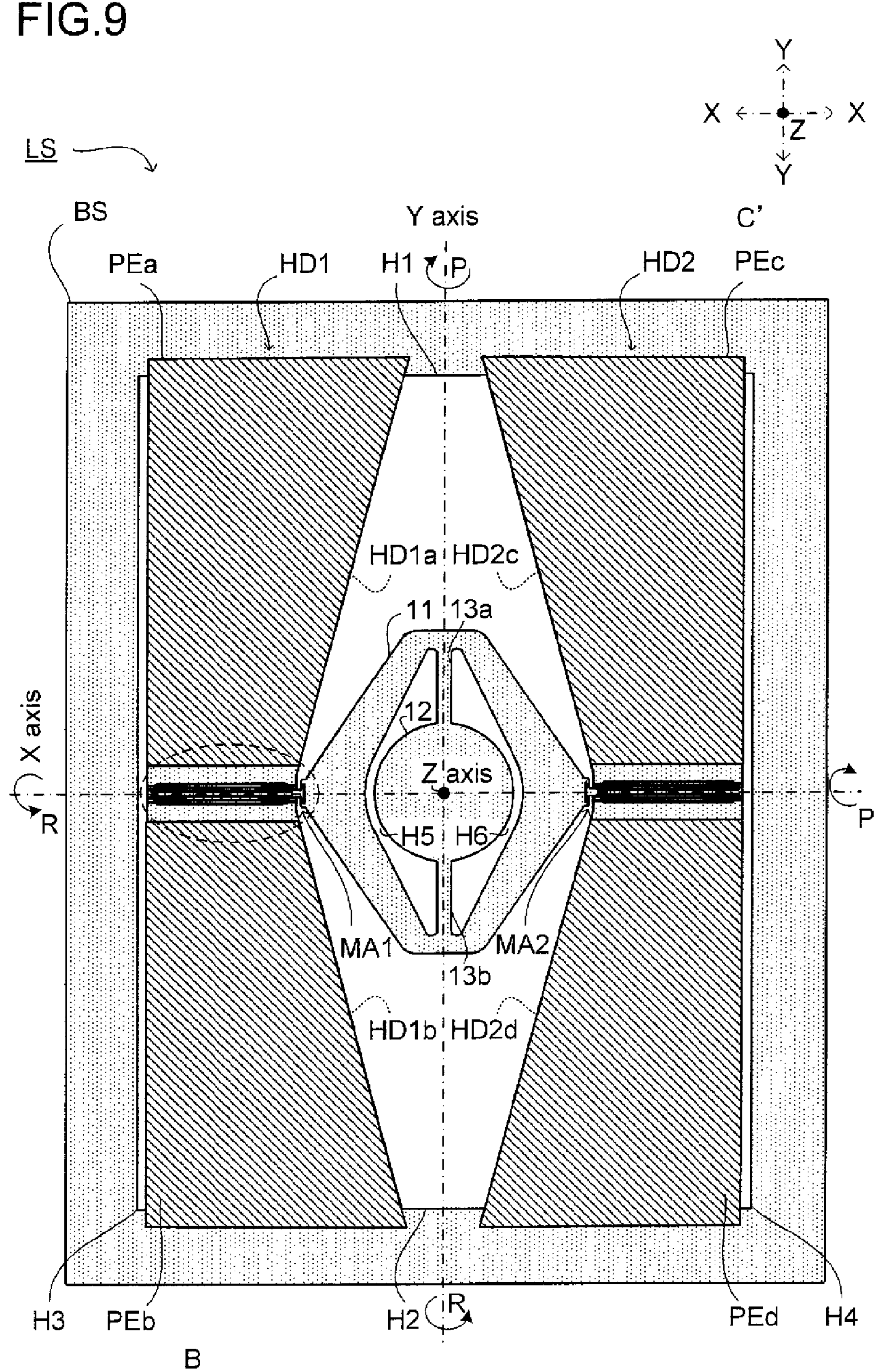
FIG. 9 is a plan view showing another two-dimensional optical scanner different from that shown in FIG. 4.
Figure 10:
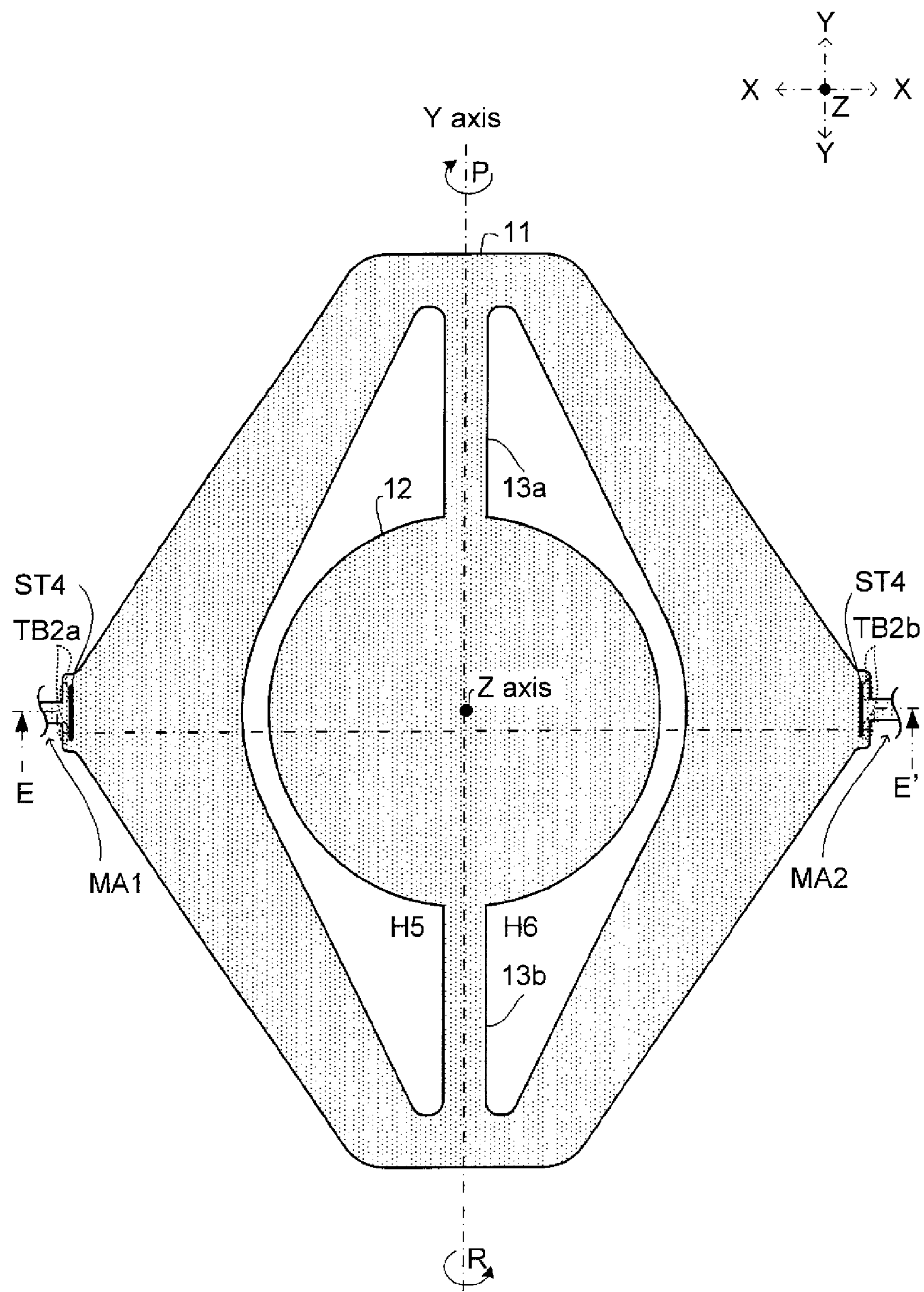
FIG. 10 is a magnified view of a mirror part shown in FIG. 9.
Figure 11A:
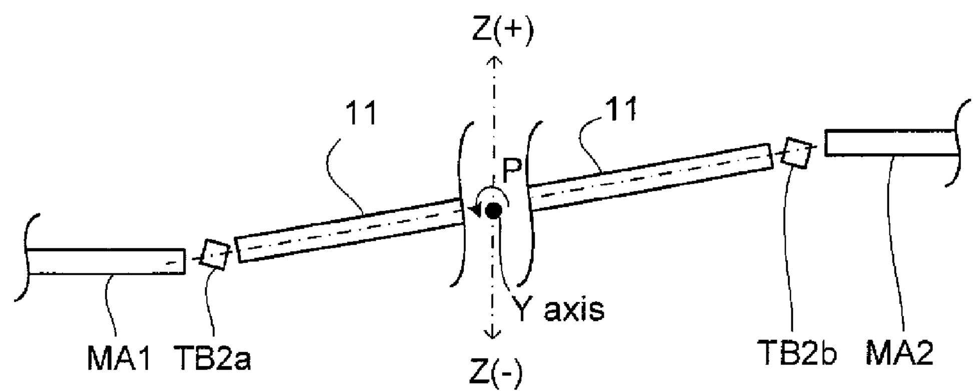
FIG. 11 A is a cross-sectional view cut along the line E-E' in FIG. 10 and shows an action of the normal rotation with respect to the Y direction.
FIG. 11B is a cross-sectional view cut along the line E-E' in FIG. 10 and shows an action of the reverse rotation with respect to the Y direction.
Figure 11B:
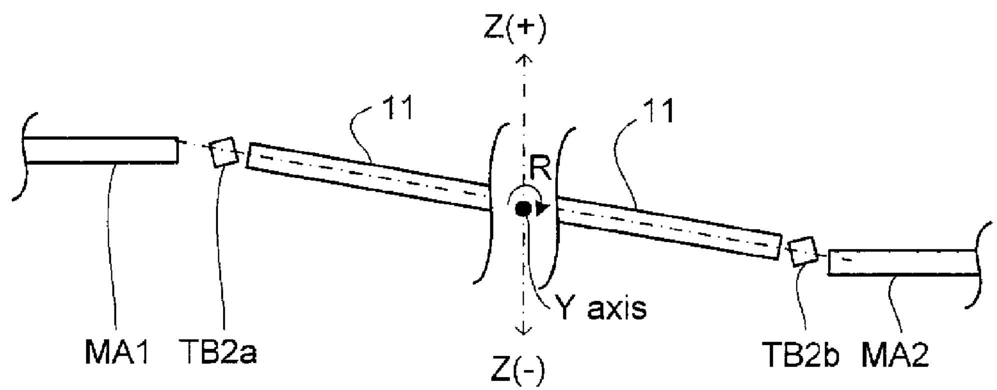

In this embodiment, the optical scanner LS having the mirror part with the torsion bar TB will be described with reference to FIGS. 9-12. Note that FIG. 9 is a plan view. In addition, FIG. 10 is a magnified view of the mirror part MR shown in FIG. 9 while FIGS. 11A and 11B are cross sections cut along the line E-E' in FIG. 10. Further, FIG. 12 is a magnified view of the part encircled by the broken line in FIG. 9.

The optical scanner LS shown in FIG. 9 includes the mirror part MR that can move in a two-dimensional manner. Furthermore, this mirror part MR includes the mirror fragment (moving fragment) 12 for reflecting light, the mirror fragment torsion bars 13 for supporting the mirror fragment 12 in a pivotable manner, and the movable frame 11 that is connected to the mirror fragment torsion bar 13 and encircles the mirror fragment 12 in the same manner as the mirror part MR of the optical scanner LS shown in FIG. 4. Furthermore, the mirror part MR is connected to the main axis parts MA via the movable frame 11.

In addition, this mirror part MR includes another torsion bar TB different from the mirror fragment torsion bar 13 (may be referred to as a second torsion bar TB2 for convenience sake). This torsion bar TB2 is formed by providing a slit (a fourth slit ST4) extending in the direction crossing (e.g., perpendicular to) the main axis direction at an end of the movable frame 11 connected to the main axis parts MA.

Figure 12:
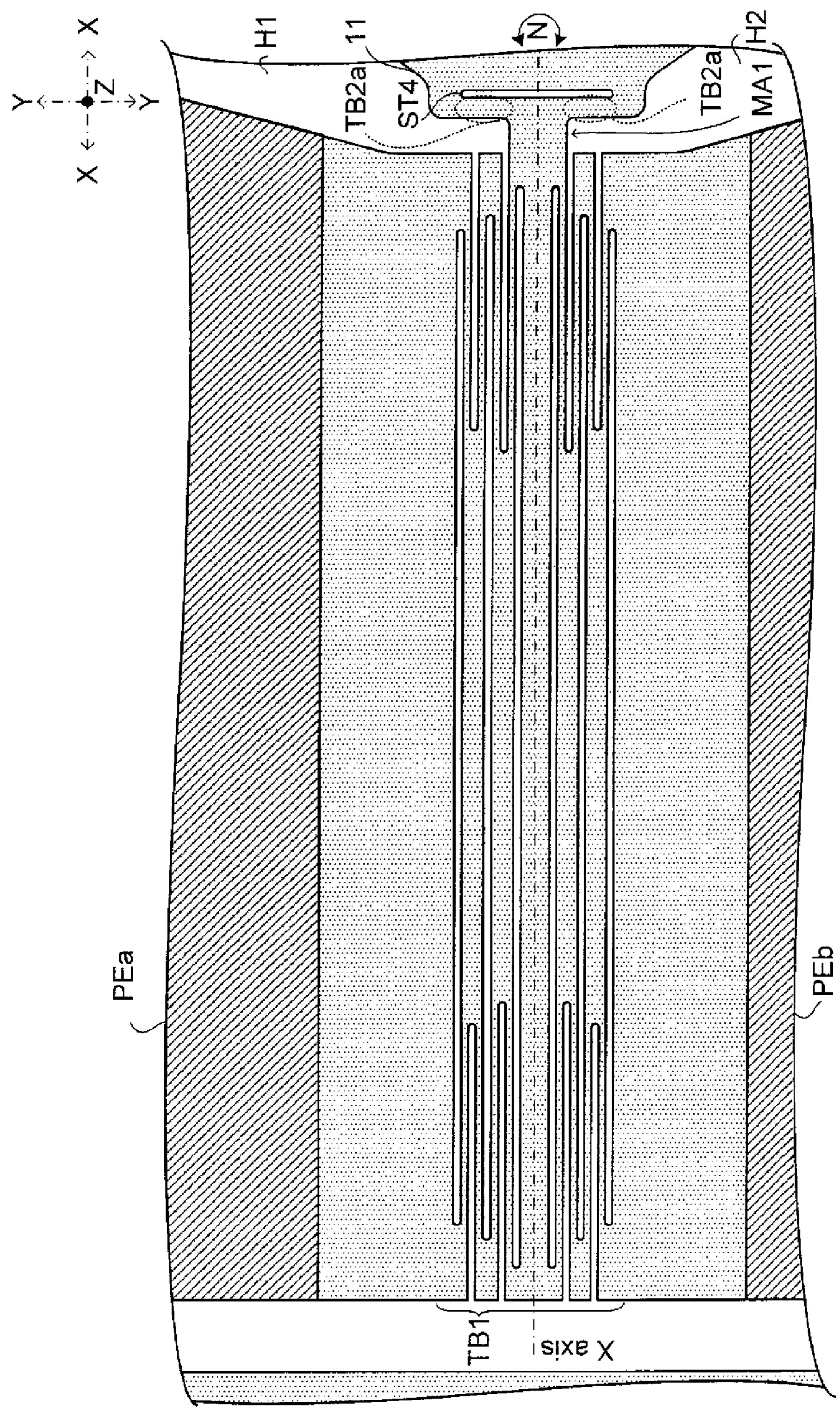
FIG. 12 is a partial magnified view of a holding part shown in FIG. 9.

More specifically, the second torsion bar TB2 is formed as a remaining part of the substrate BS between the fourth slit ST4 and the first opening H1 and the second opening H2 that extend in the direction perpendicular to the first torsion bar TB1 (e.g., the Y direction) (see FIG. 12). In other words, the second torsion bars TB2 are made of part other than the slits provided to the movable frame 11.

Since the torsion bar TB2 is formed by the fourth slit ST4 in the movable frame 11, strength of the movable frame 11 is reduced due to the gap generated in the movable frame 11. Therefore, the movable frame 11 can tilt easily with respect to the torsion bar TB2.

Here, the tilting action of the mirror part MR in the optical scanner LS having the torsion bar TB2 will be described. Note that the action of rotating the mirror part MR with respect to the main axis parts MA (the X axis) will be omitted since it is already described in the second embodiment. The rotation action of the mirror part MR with respect to the Y axis, in particular, the deformation in torsion generated in the torsion bar TB2 will be described.

When the mirror part MR rotates normally with respect to the Y direction, the voltage for expanding the piezoelectric bodies PBa and PBb of the first holding part HD1 is applied. Then, the first main axis part MA1 side of the holding fragments HD1*a* and HD1*b* in the first holding part HD1 droop toward the Z(−) side, so that the first main axis part MA1 also moves toward the Z(−) side. On the other hand, the voltage for contracting the piezoelectric bodies PBc and PBd of the second holding part HD2 is applied. Then, the second main axis part MA2 side of the holding fragments HD2*c* and HD2*d* in the second holding parts HD rise toward the Z(+) side, so that the second main axis part MA2 also moves toward the Z(+) side.

When the first main axis part MA1 of the first holding part HD1 moves toward the Z(−) side while the second main axis part MA2 of the second holding part HD2 moves toward the Z(+) side as described above, the movable frame 11 sandwiched between the first main axis part MA1 and the second main axis part MA2 is tilted as shown in FIG. 11A.

If the torsion bar TB2 is not provided, the main axis parts MA has to be integrated with the movable frame 11 and to tilt around the Y axis. In other words, the torsion bar TB1 and the holding parts HD also need the twist around the Y axis. However, large displacement and stress along the Z direction are apt to be exerted on a part of the torsion bar TB1 separated from the mirror part MR, which may cause a breakage of the torsion bar TB1.

The torsion bars TB2 (TB 2*a* and TB2*b*) prevent such a breakage by blocking an excessive twist around the Y axis from being generated in the torsion bar TB1 or the like. More specifically, the torsion bar TB2 makes the part between the main axis part MA (MA1 or MA2) and the movable frame 11 bend easily so that a twist is not generated in the torsion bar TB1 and the holding parts HD. Since the part between the main axis part MA1 or MA2 and the movable frame 11 can bend easily in this way, the main axis parts MA1 and MA2 move oppositely in the Z direction so that the movable frame 11 can rotate. As a result, the torsion bar TB1 or the like is not broken while the movable frame 11 and the mirror part MR can rotate efficiently.

The case where the mirror part MR rotates reversely with respect to the Y direction can be explained in the same way as the case where the mirror part MR rotates normally with respect to the Y direction, so description thereof will be omitted.

In addition, the torsion bar TB2 extends in the direction (e.g., the Y direction) crossing the main axis direction. It is because that this structure facilitates the twist of the torsion bar TB2 when the first main axis part MA1 and the second main axis part MA2 move that are located to sandwich the torsion bar TB2 along the X axis direction.

Figure 13:
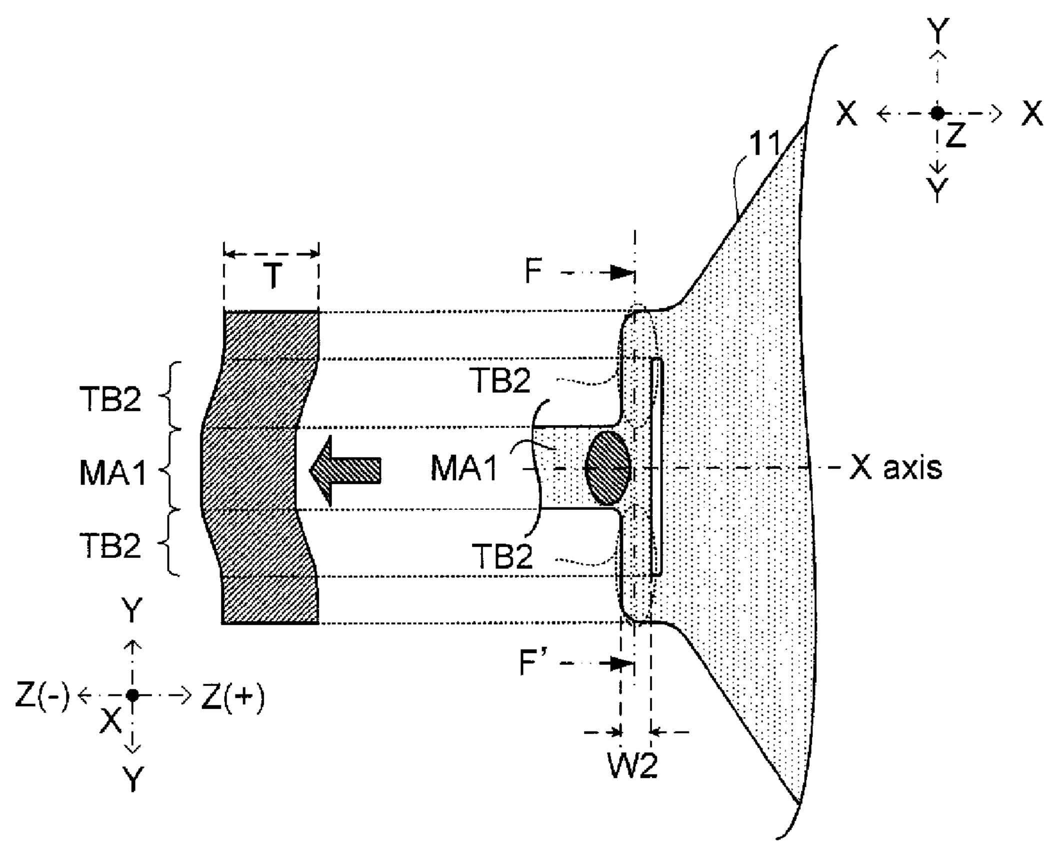
FIG. 13 shows a plan view of a movable frame having a second torsion bar and a cross-sectional view cut along the line F-F' in the plan view.

In addition, it is preferable that the length in the thickness direction of the torsion bar TB2 should be larger than the length in the width direction of the torsion bar TB2 as shown in FIG. 13. The reason will be described with reference to FIG. 13. Note that FIG. 13 shows a magnified view of the movable frame 11 and the first main axis part MA1 shown in FIG. 12 and a cross section cut along the line F-F' in the plan view in the case where the mirror part MR rotates normally.

When the movable frame 11 (therefore the mirror part MR) rotates normally with respect to the Y axis, the first main axis part MA1 droops toward the Z(−) side. When the first main axis part MA1 droops in this way, a load is exerted on the boundary between the first main axis part MA1 and the movable frame 11 (see the ellipse part with hatching).

Since this load exerts a force directed toward the Z(−) side (see an arrow with hatching), the part on which the load is put move toward the Z(−) direction. Then, an end of the torsion bar TB2 connected to the part on which the load is put also moves toward the Z(−) side, so that the torsion bar TB2 bends as a whole as shown in the cross sectional view. More specifically, an end of the torsion bar TB2 moves toward the Z direction while the other end of the torsion bar TB2 connected to the movable frame 11 does not move, so that the torsion bar TB2 is deformed to bend.

Since this bend does not contribute the deformation in torsion of the torsion bar TB2, it is not desirable. However, if the length in the thickness direction of the torsion bar TB2 (thickness T) is larger than the length in the width direction of the torsion bar TB2 (width W2), the influence of the load due to the displacement of the first main axis part MA1 can be reduced. Therefore, the deformation in torsion of the torsion bar TB2 can be secured sufficiently.

Note that the thickness direction of the torsion bar TB2 is the same as the thickness direction of the substrate BS. More specifically, the thickness direction of the torsion bar TB2 is the direction (the Z direction) perpendicular to the expanding direction of the torsion bar TB2 (the Y direction) and the main axis direction of the main axis parts MA (the X axis direction). On the other hand, the width direction of the torsion bar TB2 is the same as the main axis direction of the main axis parts MA.

In addition, the number of the torsion bars TB2 described above is not limited. More specifically, without limiting to the structure as shown in FIG. 12 in which two torsion bars TB2 are arranged along the Y direction crossing the X direction, one or three or more torsion bars TB2 may be arranged.

According to this structure, even if unnecessary rotation oscillation N is generated with respect to the X axis despite of rotating the mirror part MR with respect to the Y axis, such rotation oscillation N (see FIG. 12) is dispersed to the individual torsion bars TB2 and absorbed by the same.

Figure 14A:
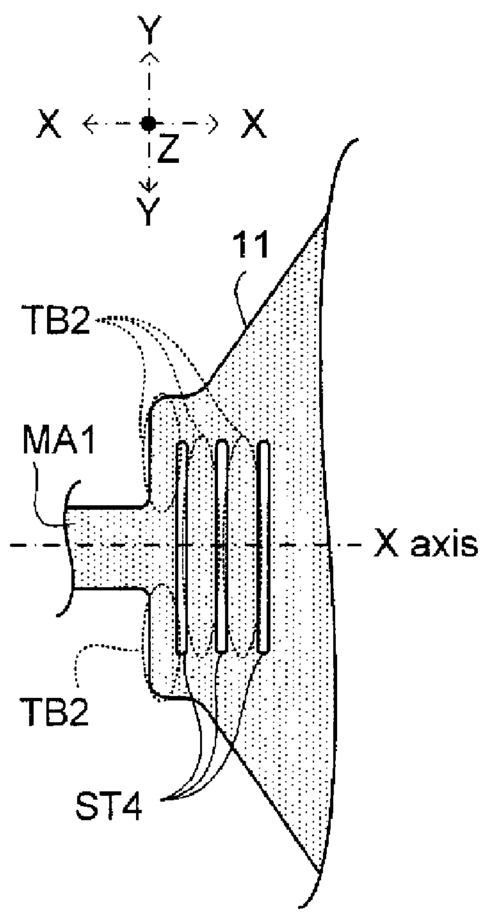
FIG. 14A is a plan view showing a movable frame on which slits having the same shape are arranged in the X direction.
Figure 14B:
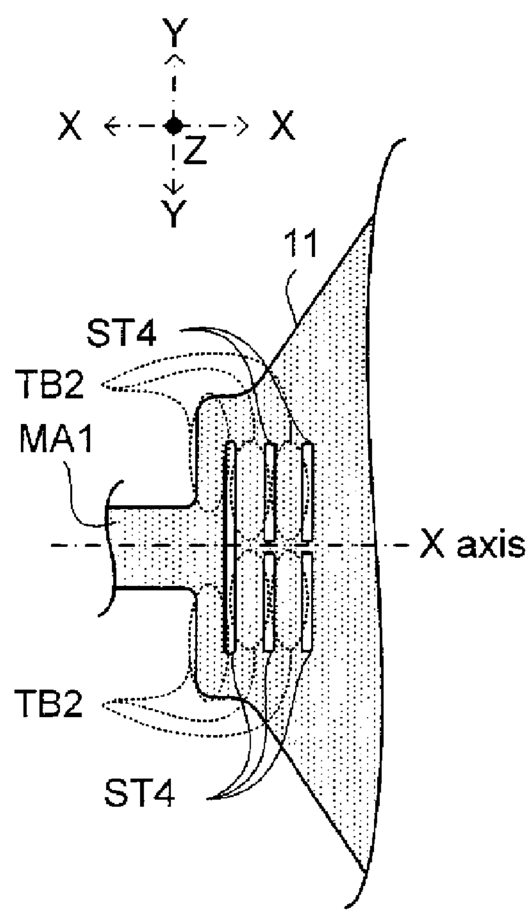
FIG. 14B is a plan view showing a movable frame on which slits having different shapes are arranged in the X direction.

In addition, as shown in FIGS. 14A and 14B, the fourth slits ST4 extending in the Y direction may be arranged in parallel in the X direction in the movable frame 11 so that more torsion bars TB2 may be formed. In other words, a plurality of torsion bars TB2 may be arranged along the axial direction of the main axis parts MA. Note that FIG. 14A shows the movable frame 11 in which the fourth slits ST4 having the same shape are arranged in parallel in the X direction while FIG. 14B shows the movable frame 11 in which the fourth slits ST4 having different shapes are arranged in parallel.

According to this structure, energy (load) based on the displacement of the main axis parts MA is dispersed and transmitted to the plurality of torsion bars TB2 arranged in parallel along the main axis direction. Therefore, the twist amount of each of the torsion bars TB2 can be small.

In addition, the dispersion of the load to the plurality of torsion bars TB2 means that the relatively small load can be transmitted easily to the torsion bar TB2. Therefore, the optical scanner LS having the torsion bars TB2 arranged in parallel in the main axis direction can rotates the mirror part MR even if the displacement of the main axis parts MA is small.

Note that the optical scanner LS having the torsion bar TB1 formed in the holding part HD and the torsion bar TB2 formed in the mirror part MR is described as the embodiment 4. However, the optical scanner LS is not limited to this structure.

For example, the optical scanner LS may have the structure in which the torsion bar TB1 is formed only in the holding parts HD (see FIGS. 1 and 4), or the structure in which the torsion bars TB1 and TB2 are formed in both the holding parts HD and the mirror part MR (see FIG. 9), or the structure in which the torsion bar TB2 is formed only in the mirror part MR.

In short, it is sufficient if the torsion bar TB is formed in at least one of the holding parts HD and the mirror part MR. It is because that only if the torsion bar TB is provided, the deformation in torsion generated in the torsion bar can be utilized for making the mirror part MR be capable of moving in a pivotable manner.

Other Embodiments

Note that the present invention is not limited to the embodiments described above but can be modified variously within the scope of the present invention without deviating from the spirit thereof.

For example, the shape and the size (area) of the piezoelectric element PE are not limited to the specific case. For example, the piezoelectric element PE may have a rectangular shape as shown in FIGS. 1 and 4, or it may have a trapezoidal shape as shown in FIG. 9.

In addition, the size of the piezoelectric element PE may have an area to the extent that one side of the holding parts HD includes (i.e., an area smaller than the area of the holding parts HD, see FIGS. 1 and 4), or it may have an area larger than one side of the holding parts HD (see FIG. 9). However, a larger size of the piezoelectric element PE is desirable since it can produce a larger force for deforming the holding parts HD in flexion.

Figure 15:
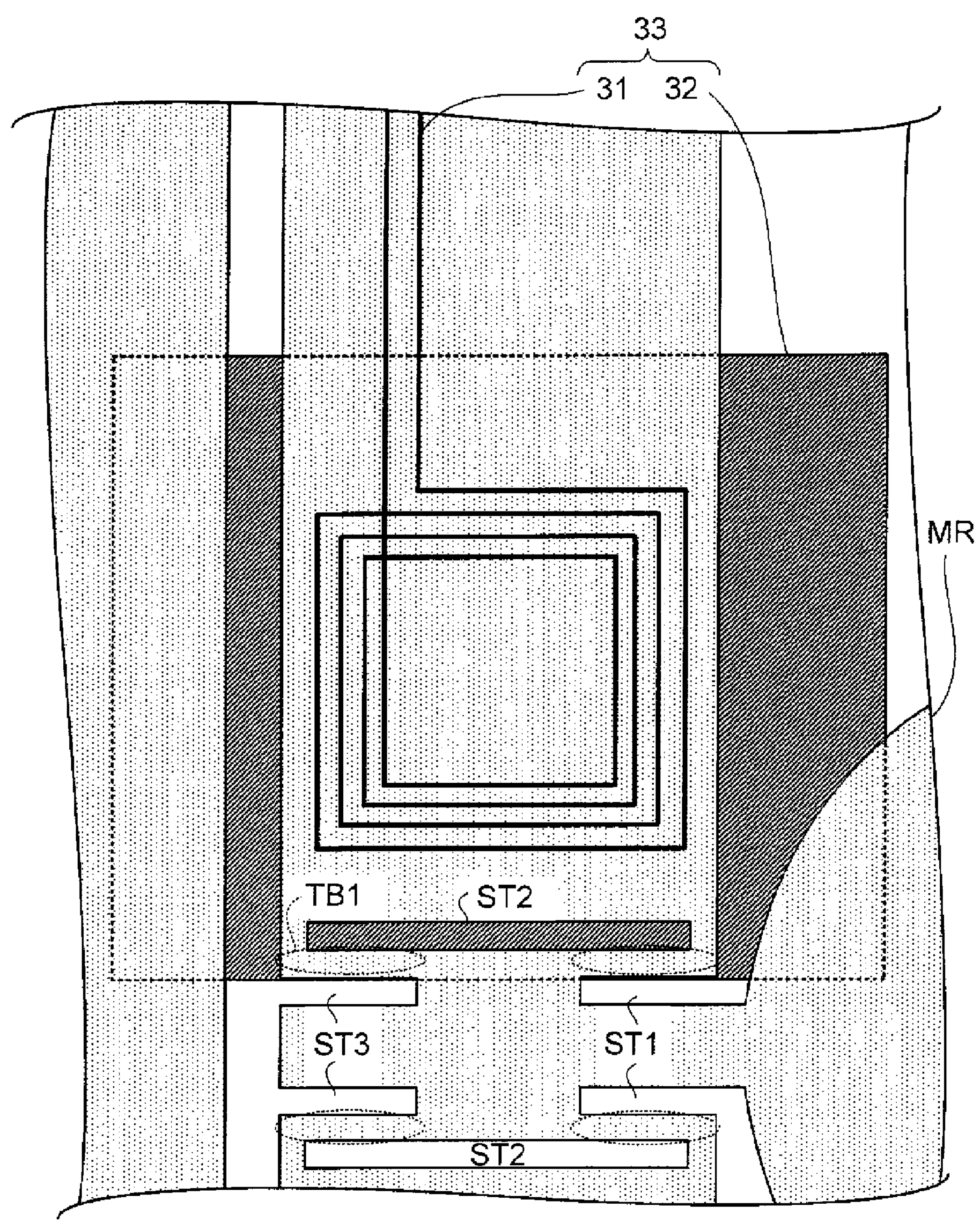
FIG. 15 is a plan view of an optical scanner using an electromagnetic system.
Figure 16:
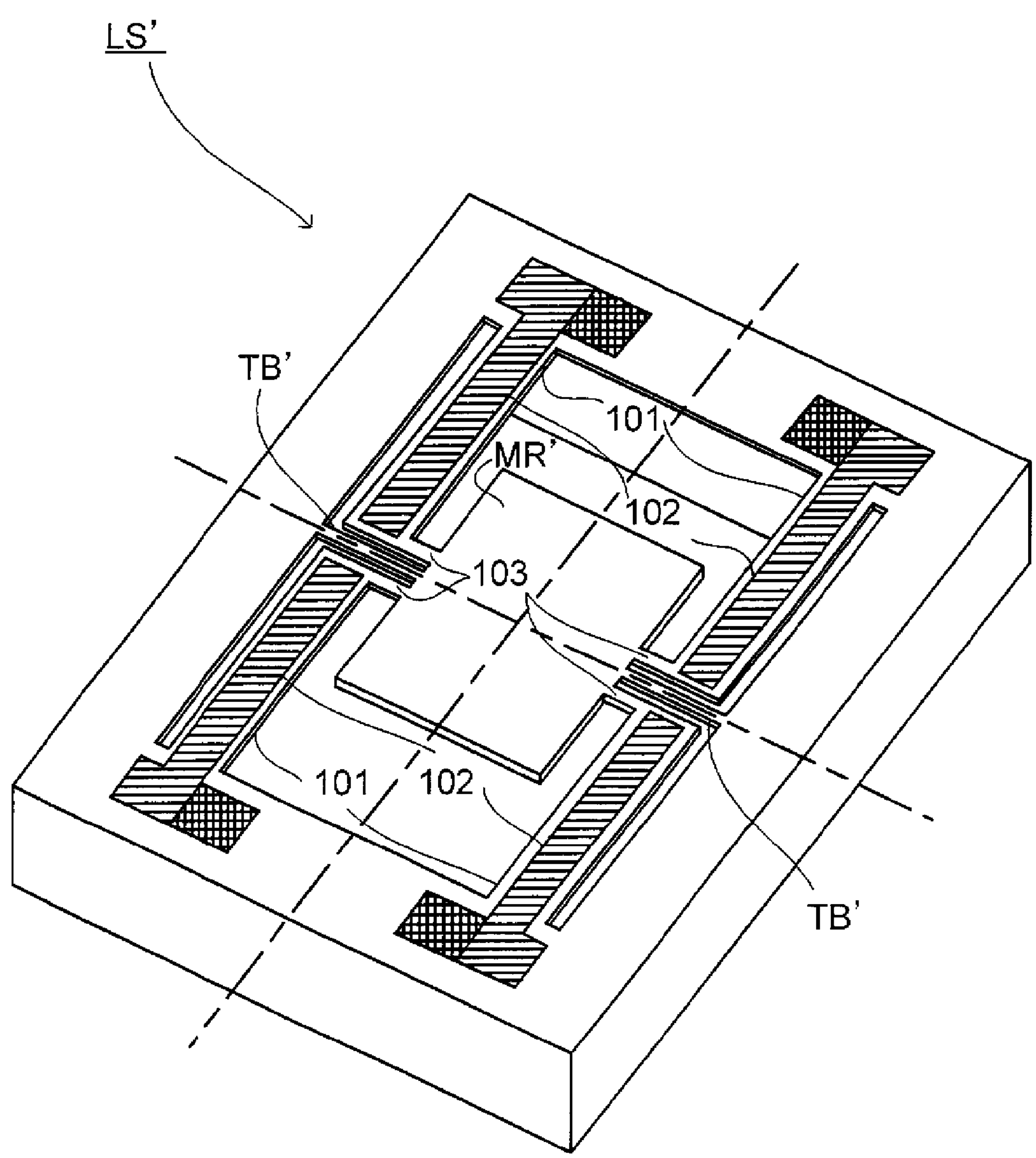
FIG. 16 is a perspective view of the conventional optical scanner.
Figure 17:
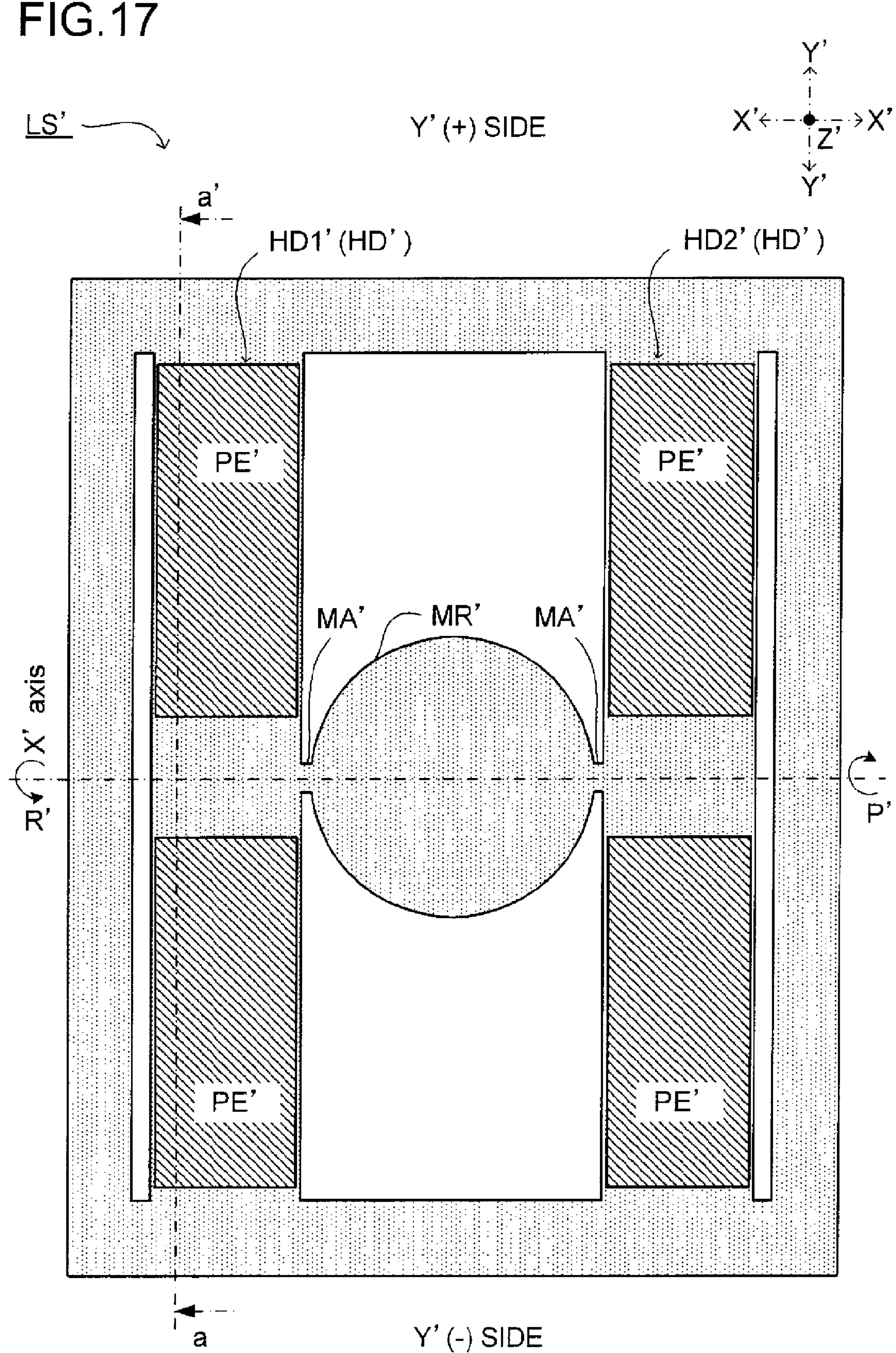
FIG. 17 is a plan view of the other optical scanner different from that shown in FIG. 16.
Figure 18A:
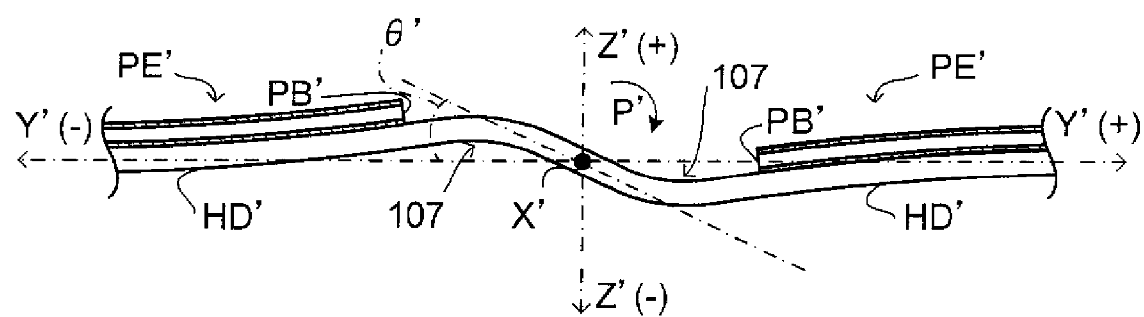
FIG. 18A is a cross-sectional view cut along the line A-A' in FIG. 17 in case of the normal rotation.
Figure 18B:
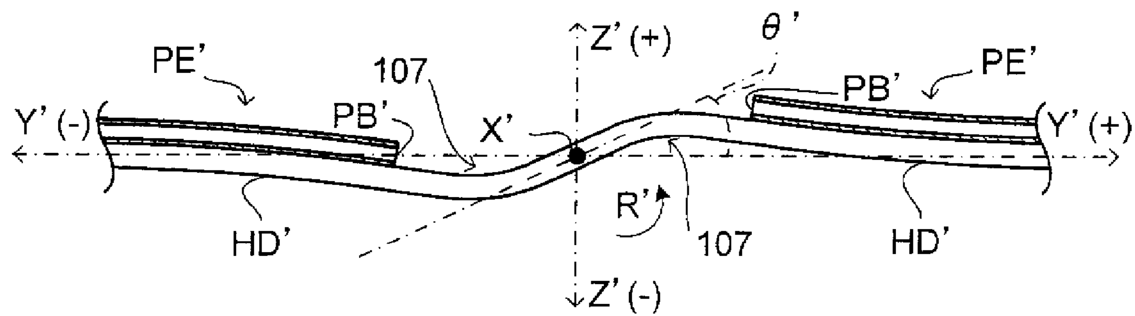
FIG. 18B is a cross-sectional view cut along the line A-A' in FIG. 17 in case of the reverse rotation.

In addition, the member (driving part) for deforming the holding parts HD is not limited to the piezoelectric element PE. For example, the driving part can be an electromagnetic unit 33 including an electromagnetic coil 31 and a permanent magnet 32 as shown in FIG. 15. When this electromagnetic unit 33 is used, the electromagnetic coil 31 is positioned on one side (a front side) of the holding parts HD while the permanent magnet 32 is positioned on the back side of the holding parts HD (with a space from the back side of the holding parts HD) so that the holding parts HD is deformed in flexion by an electromagnetic force generated by the electromagnetic coil 31 and the permanent magnet 32.

In addition, the driving part may be an electrostatic unit including two electrodes. When this electrostatic unit is used, one of the electrodes is positioned on the back side of the holding parts HD while the other electrode is positioned with a space from the holding parts HD (on the back side of the holding parts HD) so that the holding parts HD is deformed in flexion by an electrostatic force generated by the electrodes.

Note that it is possible to assume various optical equipments equipped with the optical scanner LS that is described above. For example, a projector (an image projection apparatus) and an image forming apparatus such as a copy machine or a printer can be exemplified. In addition, a microscanner having a lens (a refraction optical system) instead of the mirror part MR or a microscanner having a light source (a light emission element) can be exemplified as other microscanner than the optical scanner.

If the contents of the above description is summarized, it can be expressed as follows.

The microscanner includes a variable member, a main axis part for supporting the variable member in a pivotable manner, a deformable holding part for holding the main axis part, and a torsion bar disposed adjacent to the main axis part and located on at least one of the holding part and the variable member. Then, in this microscanner, the torsion bar is deformed in torsion by deformation in flexion of the holding part, and the variable member is tilted by the deformation in torsion of the torsion bar.

Since this torsion bar can be deformed in torsion by a relatively small force, the holding part can be deformed in flexion more easily so that the deformation quantity increases. This increased deformation quantity causes a relatively large tilt of the variable member. As a result, the microscanner can increase the tilt angle of the variable member easily.

In other words, the microscanner can obtain an appropriate variation quantity for rotating the variable member by utilizing the torsion bar positioned in at least one of the holding part and the variable member while it is adjacent to the main axis part. Therefore, the microscanner can increase the tilt angle of the variable member easily.

Note that the torsion bar if provided by forming a slit in the holding part made of a single substrate, for example, and the microscanner itself is formed on the substrate. In addition, it is preferable to provide the holding part with a driving part for deforming the holding part itself. In addition, if the variable member is a mirror part including a metal film for reflecting light, the microscanner may be called an optical scanner.

Here, the torsion bar will be described in detail. First, the torsion bar (the first torsion bar) positioned in the holding part will be described. The first torsion bar converts the deformation in flexion of the holding part itself into a deformation in torsion, which is transmitted to the main axis part.

The holding part is a deformable member. However, a holding part having a uniform thickness can hardly gain a large deformation quantity even if it can be deformed, for example. As a result, energy to be transmitted to the main axis part connected to the holding part also hardly increase. However, if the first torsion bar is provided, energy to be transmitted to the main axis part becomes relatively large since the deformation in flexion of the holding part increases. Therefore, the variable member supported by the main axis part is also tilted relatively largely.

Furthermore, it is desirable that the first torsion bar should extend in the direction crossing the expanding direction of the holding part (e.g., the direction perpendicular to the same). Thus, when the holding part is deformed in flexion along the expanding direction, the first torsion bar can be twisted easily. In other words, the deformation in torsion can be generated easily.

In addition, it is desirable that the first torsion bar should be made up of a part other than the slits formed in the holding part (e.g., a part between slits arranged in parallel with the holding part). When the first torsion bar is formed by the slits in the holding part, strength of the holding part is reduced because of a gap generated in the holding part. Therefore, the holding part can be deformed in flexion easily. Note that the first torsion bar extends in the direction crossing the expanding direction of the holding part, so the slit also extends in the same direction.

When the holding part having an elongated shape is deformed in flexion, a load is generated that is directed toward the bending direction of the holding part (the same direction as the thickness direction of the holding part), and the load is exerted on the first torsion bar, too. Then, the bending deformation of the first torsion bar due to the load becomes a loss in case of tilting the variable member.

Therefore, it is desirable that the length in the thickness direction of the first torsion bar (i.e., the thickness direction of the holding part) should be larger than the length in the width direction of the first torsion bar (the expanding direction of the holding part). Thus, even if the torsion bar has a constant torsional rigidity, it is possible to obtain a structure that is hard to be deformed in the thickness direction of the holding part.

In addition, when the holding part having an elongated shape is deformed in flexion, a rotation oscillation with respect to the expanding direction is also generated in the holding part. If the rotation oscillation is close to the drive frequency of the variable member, an abnormal vibration that can cause a breakage may be generated. Therefore, it is desirable that a plurality of first torsion bars are arranged in parallel in the direction crossing the expanding direction of the holding part.

According to this structure, the rotation oscillation generated in the deforming holding part is suppressed by the plurality of first torsion bars. Therefore, thanks to this rotation oscillation, quantity of the deformation in torsion of the first torsion bar is not reduced.

In addition, it is desirable that the plurality of first torsion bars should be arranged in parallel along the expanding direction of the holding part. According to this structure, the deformation in flexion of the holding part along the expanding direction is dispersed and transmitted to the plurality of first torsion bars arranged in parallel along the expanding direction. Therefore, the twist amount of each of the first torsion bars can be reduced.

However, it is desirable that the plurality of first torsion bars arranged in parallel along the expanding direction of the holding part should have different entire lengths. More specifically, it is desirable that the entire lengths of the first torsion bars become shorter as being farther from the main axis part.

Normally, the moment exerted on the first torsion bar becomes larger as being farther from the main axis part. However, the shorter first torsion bar that is farther from the main axis part has larger rigidity. Then, an appropriate rigidity for a magnitude of the moment can be obtained, so it is possible to avoid the situation where an excessive deformation in torsion is generated only in the first torsion bar that is far from the main axis part.

Note that the method of adjusting a level of the rigidity and a magnitude of the moment appropriately is not limited to changing the length of the first torsion bars. For example, as for the first torsion bars arranged in parallel along the expanding direction of the holding part, the lengths in the width direction of the first torsion bars may be different from each other. More specifically, the lengths in the width direction of the first torsion bars may be longer as being farther from the main axis part. This can also adjust a level of the rigidity and a magnitude of the moment appropriately.

Next, the torsion bar (the second torsion bar) located in the variable member will be described. This second torsion bar includes the moving fragment, the sub axis part for supporting the moving fragment in a pivotable manner, and the movable frame that is connected to the sub axis part and surrounds the moving fragment. The second torsion bar is used for the microscanner having the variable member that is connected to the main axis part via the movable frame. Then, the second torsion bar receives the deformation in flexion of the holding part itself via the main axis part while it converts the deformation in flexion into the deformation in torsion, which is transmitted to the movable frame.

According to this structure, when the movable frame is rotated around the sub axis part by the deformation in flexion of the holding part, the rotation force around the sub axis part is not transmitted to the holding part and the first torsion bar because the second torsion bar is bent. In addition, the main axis parts sandwiching the movable frame are moved upward and downward oppositely (in the directions perpendicular to the main axis direction and the sub axis direction) so that the movable frame rotates around the sub axis part, so the holding part and the first torsion bar are not deformed excessively. Therefore, the movable frame and the mirror part can be rotated efficiently thanks to the second torsion bar.

Note that if the second torsion bar has the same structure as the first torsion bar, the second torsion bar can also obtain the same effect as the first torsion bar.

In addition, optical equipment having the microscanner described above is also included in the scope of the present invention.

The specific embodiments, examples and the like described above should be interpreted as those for clarifying the technical contents of the present invention. Therefore, the present invention should not be interpreted in a narrow sense limiting to only the concrete examples but can be modified variously within the scope of the attached claims.

What is claimed is:

1. A microscanner comprising:

a variable member;

a main axis part for supporting the variable member in a pivotable manner;

a deformable holding part for holding the main axis part; and a torsion bar disposed adjacent to the main axis part and located on at least one of the holding part and the variable member, wherein the torsion bar is deformed in torsion by deformation in flexion of the holding part, and the variable member is tilted by the deformation in torsion of the torsion bar.

2. The microscanner according to claim 1, wherein the torsion bar is provided by forming slits in the holding part, and the microscanner itself is formed on a single substrate.

3. The microscanner according to claim 1, wherein the holding part is provided with a driving part for deforming the holding part itself.

4. The microscanner according to claim 1, wherein the variable member is a mirror part including a metal film for reflecting light.

5. The microscanner according to claim 1, wherein the torsion bar located in the holding part is a first torsion bar that converts the deformation of the holding part itself into a deformation in torsion, which is transmitted to the main axis part.

6. The microscanner according to claim 5, wherein the first torsion bar extends in the direction crossing the expanding direction of the holding part.

7. The microscanner according to claim 5, wherein a length in the thickness direction of the first torsion bar is larger than a length in the width direction of the first torsion bar.

8. The microscanner according to claim 5, wherein a plurality of first torsion bars are arranged in parallel in the direction crossing the expanding direction of the holding part.

9. The microscanner according to claim 5, wherein a plurality of first torsion bars are arranged in parallel along the expanding direction of the holding part.

10. The microscanner according to claim 9, wherein the plurality of first torsion bars arranged in parallel along the expanding direction of the holding part have different entire lengths.

11. The microscanner according to claim 10, wherein the entire lengths of the first torsion bars become shorter as being farther from the main axis part.

12. The microscanner according to claim 9, wherein the plurality of first torsion bars arranged in parallel along the expanding direction of the holding part have different lengths in the width direction.

13. The microscanner according to claim 12, wherein the lengths in the width direction of the first torsion bars become longer as being farther from the main axis part.

14. The microscanner according to claim 1, wherein the variable member includes a moving fragment, a sub axis part for supporting the moving fragment in a pivotable manner, and a movable frame that is connected to the sub axis part and surrounds the moving fragment, the variable member being connected to the main axis part via the movable frame, and the torsion bar located in the variable member is a second torsion bar that receives the deformation in flexion of the holding part itself via the main axis part while it converts the deformation in flexion into the deformation in torsion, which is transmitted to the movable frame.

15. An optical equipment having a microscanner, the microscanner comprising:

a variable member;

a main axis part for supporting the variable member in a pivotable manner;

a deformable holding part for holding the main axis part; and a torsion bar disposed adjacent to the main axis part and located on at least one of the holding part and the variable member, wherein the torsion bar is deformed in torsion by deformation in flexion of the holding part, and the variable member is tilted by the deformation in torsion of the torsion bar.

* * * * *